United States Patent
Kennedy et al.

(10) Patent No.: US 9,384,489 B2
(45) Date of Patent: Jul. 5, 2016

(54) POPULATION SELECTION FRAMEWORK, SYSTEMS AND METHODS

(75) Inventors: Michael Kennedy, Rancho Palos Verdes, CA (US); Marjolaine Fontaine, Montreal (CA)

(73) Assignee: Oracle International Corporation, Redwood Shores, CA (US)

( * ) Notice: Subject to any disclaimer, the term of this patent is extended or adjusted under 35 U.S.C. 154(b) by 1254 days.

(21) Appl. No.: 12/192,377

(22) Filed: Aug. 15, 2008

(65) Prior Publication Data

US 2009/0083330 A1 Mar. 26, 2009

Related U.S. Application Data

(63) Continuation of application No. 12/042,713, filed on Mar. 5, 2008, now Pat. No. 8,589,813.

(60) Provisional application No. 61/013,841, filed on Dec. 14, 2007, provisional application No. 60/975,139, filed on Sep. 25, 2007.

(51) Int. Cl.
*G06F 17/30* (2006.01)
*G06Q 30/02* (2012.01)

(52) U.S. Cl.
CPC .......... *G06Q 30/02* (2013.01); *G06F 17/30557* (2013.01)

(58) Field of Classification Search
CPC .......... G06F 17/30525; G06F 17/3056; G06F 17/30563; G06F 17/30569
USPC .................................................. 715/968, 771
See application file for complete search history.

(56) References Cited

U.S. PATENT DOCUMENTS

| | | | |
|---|---|---|---|
| 5,832,481 A | 11/1998 | Sheffield | |
| 5,844,554 A | 12/1998 | Geller et al. | |
| 5,894,554 A | 4/1999 | Lowery et al. | |
| 6,105,043 A * | 8/2000 | Francisco et al. | 715/234 |
| 6,208,345 B1 * | 3/2001 | Sheard et al. | 715/853 |
| 6,356,901 B1 * | 3/2002 | MacLeod et al. | |
| 6,408,303 B1 * | 6/2002 | Richards | |
| 6,631,497 B1 * | 10/2003 | Jamshidi | G06F 17/30569 707/E17.006 |
| 6,718,336 B1 | 4/2004 | Saffer et al. | |
| 7,159,188 B2 | 1/2007 | Stabb et al. | |

(Continued)

OTHER PUBLICATIONS

U.S. Appl. No. 12/042,713, filed Mar. 5, 2008 Office Action mailed Feb. 4, 2011, 17 pages.

(Continued)

*Primary Examiner* — Alvin Tan

(57) ABSTRACT

Tools providing a flexible selection framework for automated processes. The framework can allow end-users to define their own selection criteria to select a data population to be processed (for example, by a business application). Hence, the tools provide enhanced control over what data is provided to which process. Some such tools employ metadata to define what information the client process needs, how the results will be returned to the client process, and/or what selection tools should be available to select data for the client process, as well as the available data selection tools, which can include both tools provided with a business application as well as third-party and/or user supplied selection tools. The framework might also provide an application programming interface that ensures consistent communication between the population selection engine and the selection tools themselves.

23 Claims, 17 Drawing Sheets

(56) References Cited

U.S. PATENT DOCUMENTS

| | | | |
|---|---|---|---|
| 7,249,056 B1 | 7/2007 | Crouthamel et al. | |
| 7,457,791 B1 * | 11/2008 | Garg et al. | 706/47 |
| 7,519,622 B2 | 4/2009 | Fernandez | |
| 7,747,562 B2 | 6/2010 | Gould et al. | |
| 7,814,052 B2 | 10/2010 | Bezar et al. | |
| 8,589,813 B2 | 11/2013 | Kennedy et al. | |
| 8,694,880 B2 | 4/2014 | Krasner et al. | |
| 2006/0007464 A1 * | 1/2006 | Percey | 358/1.13 |
| 2006/0282427 A1 | 12/2006 | Shurtleff et al. | |
| 2008/0034015 A1 * | 2/2008 | Behnen et al. | 707/204 |
| 2009/0083650 A1 | 3/2009 | Kennedy et al. | |
| 2009/0083652 A1 | 3/2009 | Krasner et al. | |

OTHER PUBLICATIONS

U.S. Appl. No. 12/042,713, filed Mar. 5, 2008, Advisory Action mailedOct. 19, 2011, 2 pages.

U.S. Appl. No. 12/042,713, filed Mar. 5, 2008, Final Office Action mailed Jul. 20, 2011, 16 pages.

U.S. Appl. No. 12/042,738, filed Mar. 5, 2008, Final Office Action mailed Aug. 29, 2011, 20 pages.

U.S. Appl. No. 12/042,738, filed Mar. 5, 2008, Office Action mailed Mar. 18, 2011, 19 pages.

U.S. Appl. No. 12/042,713, filed Mar. 5, 2008, Non-final Office Action mailed Nov. 21, 2012, 17 pages.

U.S. Appl. No. 12/042,713, filed Mar. 5, 2008, Final Office Action mailed Apr. 5, 2013, 21 pages.

U.S. Appl. No. 12/042,738, filed Mar. 5, 2008, Non-final Office Action mailed Nov. 23, 2012, 18 pages.

U.S. Appl. No. 12/042,738, filed Mar. 5, 2008, Final Office Action mailed Apr. 25, 2013, 23 pages.

U.S. Appl. No. 12/042,738, Notice of Allowance mailed on Nov. 12, 2013, 21 pages.

U.S. Appl. No. 12/042,713, filed Mar. 5, 2008, Notice of Allowance mailed Jul. 17, 2013, 15 pages.

U.S. Appl. No. 12/042,738, filed Mar. 5, 2008, Advisory Action mailed Aug. 15, 2013, 3 pages.

* cited by examiner

Population Selection Tool

*Selection Tool: PS Query — 305

Description: PeopleSoft Query Manager — 310

Status: Active ▶  ☑ Automated Selection

Tool Configuration

*Application Class: SCC_POP_SELECT:MODEL:Adapters:PSQueryAdapter — 315

*Application Class: SCCPS_PSQRY_VW 🔍 Pop Select PS Query Prompt Vw — 320

*Selection Label: Query Name — 325

*Maximum Results Rows: 50,000 — 330

☑ Enable Preview Results

Maximum Preview Rows: 300 — 335

Tool Launch Parameters

Tool URL Label: Launch Query

Menu Name: QUERY_MANAGER 🔍 Query Manager

Menu Bar Name: USE 🔍 &Use

Menu Item Name: QUERY_MANAGER 🔍 Query &Manager

Menu Page Name: QRY_RECORDS 🔍 Query Manager Records Tab

| Context Definition | Selection Mapping |

*Context Name: SI Mass Assignment (Person)
Process Type: Applications Engine
Process Name: SCC_SI_ASSN — 355
Description: Assign Service Indicators for Individuals
*Status: Active

360

Applicable Menu Navigation           Customize | Find | ▼ :::       First ▼ 1-2 of 2 ▶ Last

| | *Menu Name | *Component Name | | |
|---|---|---|---|---|
| 1 | AV_MAINTAIN_PEOPLE_DATA 🔍 | SCC_SI_ASSN 🔍 | + | − |
| 2 | SCC_SRV_IND 🔍 | SCC_SI_ASSN 🔍 | + | − |

Applicable Selection Tools           Customize | Find | ▼ :::       First ▼ 1-3 of 3 ▶ Last

| | Selection Tool | Description | Full Access | Exception | | |
|---|---|---|---|---|---|---|
| 1 | PS Query ▶ | PeopleSoft Query Manager | ✓ | Exception | + | − |
| 2 | Equation Engine ▶ | Student Administration Equation Engine | ✓ | Exception | + | − |
| 3 | External File ▶ | Student Administration File Parser | ✓ | Exception | + | − |

365

350

| Context Definition | Selection Mapping |

Context Name Student Group Batch
Status Active

Pop Selection Integration

☐ Context Varies per Application Data

Process Required Fields                                    Find | View All   First ◀ 1 of 1 ▶ Last Results Record          [STDNT_GRP_TRGT] 🔍    Pop Select Student Group Target
Required Fields Record [STDNT_GRP_BIND] 🔍    Pop Select Student Group Bind
                             —385

✓ Validate Edit Prompt Values

Required Fields Mapping                Customize | Find | 🔳   First ◀ 1-2 of 2 ▶ Last

| Results Record Fields | *Mapping Action | Required Fields |
|---|---|---|
| 1 EMPLID | Direct ▼ | EMPLID 🔍 |
| 2 PROCESS_INSTANCE | Process Instance ▼ | |

Process Student Groups

Run Control ID: MIKE

Population Selection

☑ Population Selection

Selection Tool | PS Query ▸ | — 505
Query Name | STUDENT_GROUP_QUERY_SAMPLE — 510

Edit Prompts 🔍

Launch Query Manager — 515    Preview Selection Results — 520

Student Group Data — 525

| *Academic Institution | PSUNV 🔍 | PeopleSoft University |
| *Student Group | 360 🔍 | Test 360 Stdnt Services Center |
| *Effective Date | 03/09/2006 📅 | |
| *Effective Status | Active ▸ | |
| Comment | | |

Student Override

☐ Student Override

Report Manager    Process Monitor    [Run]

POPULATION SELECTION FRAMEWORK, SYSTEMS AND METHODS

CROSS-REFERENCE TO RELATED APPLICATIONS

This application is a continuation application of co-pending U.S. patent application Ser. No. 12/042,713, filed Mar. 5, 2008 and entitled "Population Selection Framework, Systems and Methods, which claims the benefit, under 35 U.S.C. §119(e), of provisional U.S. Pat. App. No. 60/975,139, filed Sep. 25, 2007 by Michael Kennedy et al. and entitled "Population Selection Framework, Systems and Methods," and provisional U.S. Pat. App. No. 61/013,841, filed Dec. 14, 2007 by Marina Krasner et al. and entitled "Population Selection and Update Framework, Systems and Methods." The entire disclosure of each of these provisional applications is hereby incorporated herein by reference for all purposes.

This application is also related to U.S. patent application Ser. No. 12/042,738, filed on Mar. 5, 2008 by Michael Kennedy et al. and entitled "Population Update Framework, Systems and Methods," the entire disclosure of which is incorporated herein by reference for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to business applications and more particularly, to tools for selecting data to be processed by business applications and/or for updating data in business objects.

BACKGROUND

Many businesses, educational institutions, and other organizations use software applications (and/or suites of such applications) to organize their business affairs, track business performance, manage employee data (and/or student data, etc.) and/or the like. Such applications (referred to herein as "business applications") are often quite complex, relying on numerous database tables to store and manage data for virtually every aspect of an organization's business. Merely by way of example, business applications can include supply chain management ("SCM") applications that manage raw materials, work-in-process and/or finished products, coordinate with suppliers, and/or the like; customer relations management ("CRM") applications that are used to track, store and/or manage customer information; financial applications that track and/or analyze the financial performance of the organization; human resources applications that provide management of the human resources functions of the organization; and/or the like. In some cases, these business applications are standalone applications; in other cases, a single business application (and/or suite of applications) might provide some or all such functionality. One type of business application is referred to enterprise resource planning ("ERP") software. Examples of business applications include, without limitation, JD Edwards EnterpriseOne, PeopleSoft Enterprise applications (including, for example, PeopleSoft Enterprise Student Administration), and the Oracle eBusiness Suite, all available from Oracle Corporation.

One task commonly required of a business application is to process data in one or more data objects (which can include, but is not necessarily limited to, data stored in one or more tables of a database managed by a relational database management system ("RDBMS") and maintained by the business application, data stored in an object-oriented data structure outside of a database, data stored in a flat tile, spreadsheet, etc., and/or the like). Processing data can include many tasks, including without limitation, adding new data to the data object (e.g. adding new records to a table, adding data to an existing record, etc.) from a data source outside the data object, and/or updating existing data in a data object (e.g., modifying properties or parameters of an object-oriented business object, modifying fields in a database record/table, etc.). Business applications often provide automated (or semi-automated) processes for performing these tasks. Oftentimes, not all available data should be processed, however; instead, the business application's process(es) should be applied selectively, so as to only process the appropriate data.

In the past, the criteria to select a data population to process were predefined and delivered bundled with business application processes. This solution left end users with little or no flexibility on how to refine the selection criteria. Often, consulting services or internal engineering resources were employed to extend or modify the delivered processes to fit the customers' ever changing criteria requirements. Modifying the large number of automated processes and maintaining these enhancements proved costly to customers.

Similarly, tools for updating data in such business objects have exhibited shortcomings. Merely by way of example, in many cases, data objects are not directly-accessible for modification by end users, but instead require access via an application programming interface ("API"). While there may exist tools for modifying a data object via this API, such tools are often inflexible, providing users with insufficient ability to effect changes in the data objects. Moreover, while users may, in some instances, have the ability to update data in a business object directly, in many such instances, indiscriminate modification of a data object (such as modification of a key field in a database record), can produce undesirable and/or catastrophic results ranging from reduced performance to loss of data integrity, among other problems.

Accordingly, there is a need for more flexible tools to select a data population for processing by a business application (or any other type of application). There is a further need for tools that can provide a user with flexibility to update data in data objects while still providing sufficient controls to prevent modifications that may adversely impact the updated business objects.

BRIEF SUMMARY

In an aspect, some embodiments of the invention provide a flexible selection framework for automated processes. The framework allows end-users to define their own selection criteria to select a data population to be processed (for example, by a business application). In one novel aspect, the population selection features of certain embodiments can be integrated with the interface for a business application process, providing a one step action to select and provide the appropriate data for processing by the business application.

In another novel aspect of some embodiments, the definition of the selection criteria for a process is not hard coded inside the process. This provides enhanced control over what data is provided to which process. In some cases, the user even has the option preview the selected data population for the process, in order to confirm the accuracy of the selection criteria before processing the selected data.

Tools provided by some embodiments employ metadata to define what information the client process needs, how the results will be returned to the client process, and/or what selection tools should be available to select data for the client process. In another aspect of some embodiments, metadata to define the available selection tools, which can include both tools provided with a business application as well as third-party and/or user supplied selection tools. Hence, particular embodiments of the invention easily can be configured to support new business application processes and/or selection tools without requiring extensive modification of the underlying population selection framework or its implementing software. In an aspect, this flexibility may provided, inter alia, by an application programming interface (of which one example is an object oriented interface definition), that ensures consistent communication between the population selection engine and the selection tools themselves.

Another set of embodiments provides a flexible update framework and utility for automated processes. In an aspect, an update utility can provide an interface to allow a user to employ desired selection tools (including without limitation, the selection tools of various embodiments) to select a data population to be updated. In another aspect, the update framework of these embodiments can also provide a flexible interface that can employ any of a variety of update tools to update the desired data population (including, without limitation, database procedures, such as SQL functions; object-oriented access methods, specialized applications, and/or the like).

The update framework, in some embodiments, employs metadata to define what information a data update tool needs, and/or the format in which the data should be provided to the tool. Metadata may also be used identity available update tools for the selected data objects; such tools can include both tools provided with a business application and/or database, as well as third-party and/or user supplied update tools. Hence, certain embodiments of the invention easily can be configured to support new update tools without requiring extensive modification of the underlying population update framework or its implementing software. In an aspect, this flexibility may provided, inter alia, by an adapter interface (of which one example is an object oriented interface definition), that ensures consistent communication between the population update engine and the respective interfaces (e.g., APIs) of the update tools themselves.

In specific embodiments, the update framework may also employ metadata to define, for particular types of data objects, which data elements (e.g., fields, properties, parameters, etc.) an update tool is allowed to modify, since the framework anticipates the integration of the update utility of certain embodiments with update tools that can be used to modify data objects indiscriminately. Hence, in different aspects, the update utility of various embodiments can not only provide a consistent interface between desired population selection tools and desired data update tools (including tools that are not designed to be interoperable), but can also provide controls that such existing tools lack, thereby preventing unintentional damage of data objects by prohibiting modification of protected data elements.

The tools provided by various embodiments of the invention include, without limitation, methods, systems, and/or software products. Mainly by way of example, a method might comprise one or more procedures, any or all of which are executed by a computer system. Correspondingly, an embodiment might comprise a computer system configured with instructions to perform one or more procedures in accordance with methods provided by other embodiments. Similarly, a computer program might comprise a set of instructions that are executable by one or more computer systems (and/or one or more processors therein) to perform such operations. In many cases, such software programs are encoded on physical and/or tangible computer readable media (such as, merely by way of example, optical media, magnetic media, and/or the like).

Merely by way of example, one set of embodiments provides a software framework for selecting set of data population to be processed by a business application. The framework may be implemented by computer program (i.e., a set of instructions) encoded on a computer readable medium. The computer program might be executable by a computer system to implement the framework. In a set of embodiments, the framework might comprise a population selection engine configured to provide a set of data, selected from a data source, to a business application for processing. The framework might also comprise one or more sets of selection tool metadata, including a first set of selection tool metadata comprising information about first a selection tool that can be used by the population selection engine for selecting data to provide to the business application, and/or one or more sets of selection context metadata, including a first set of selection context metadata comprising information about first a business application process implemented by the business application to process the set of data. In addition and/or alternatively, the framework might include an API for providing communication between the population selection engine and the one or more selection tools.

Another set of embodiments provides methods of processing data and/or of selecting data to be processed. An exemplary method of selecting data to be processed with a business application comprises providing a population selection framework (such as that described above, for instance). The exemplary method, in an embodiment, further comprises providing a user interface from a computer system and/or receiving via, the user interface, a first set of selection tool metadata for a first selection tool that can be used by the population selection engine for selecting data to provide to the business application and/or a first set of selection context metadata comprising information about first a business application process implemented by the business application to process the data. In some embodiments, the method further comprises configuring the population selection engine based on the first set of selection tool metadata and the first set of selection context metadata, and/or providing, e.g., via the user interface, a display to allow the user to select the first selection tool (for selecting a set of data from a data source), and the first business application process (for processing the selected set of data).

Another exemplary method of selecting data for processing with a business application comprises providing, at a computer system, a population selection engine for selecting data to be processed with a business application, and/or providing, from the computer system, a user interface for a user to interact with the population selection engine. In some cases, the method further comprises, receiving, via the user interface, identification of a first selection tool to be used to select data to be processed with the business application and/or identifying a data source comprising the data to be processed with the business application. The method might also include invoking, from the population selection engine, a selection tool to select data to be processed with the business application, receiving, from the selection tool, a selection of one or more sets of data to be processed with the business application, and/or providing the selected one or more sets of data to the business application for processing.

Other embodiments provide a method of processing data with a business application. One such method comprises providing, at a computer system, a population selection engine for selecting data to be processed with the business application, and/or maintaining, at the computer system, a set of metadata for each of one or more selection tools. The set of metadata in an aspect, might define a relationship between each of the one or more selection tools and the population selection engine. The method can further include providing, from the computer system, a user interface for a user to interact with the population selection engine, receiving, via the user interface, identification of a first selection tool to be used to select data to be processed with the business application, and/or identifying a data source comprising the data to be processed with the business application. In some cases, the method also includes invoking, based on at least a portion of the set of metadata, the first selection tool from the population selection engine to select data to be processed with the business application, receiving, from the selection tool, a selection of one or more sets of data to be processed with the business application. Optionally, the method can include processing each of the one or more sets of data with the business application and/or displaying an indication of a result of the processing.

Another exemplary embodiment provides methods of updating data in one or more business objects. One such method comprises providing, at a computer system, a population update engine for updating data in business objects, and/or maintaining, at the computer system, a first set of update context metadata for one or more update tools, the set of update context metadata defining a relationship between the one or more update tools and the and the population update engine. In some cases, the method might also comprise maintaining, at the computer system, a second set of update context metadata for a one or more data populations, each of the data populations comprising a plurality of business objects, the second set of update context metadata comprising information about a structure of business objects in each of the data populations.

The method, in an aspect, may also include providing, from the computer system, a user interface for a user to interact with the population update engine, and/or receiving, at the population update engine and via the user interface, a first user input. Based, in some cases on the first user input, a data population to be updated can be identified; the data population, in an aspect, comprises one or more business objects. The method, then, may include identifying an update tool for updating the selected data population and/or determining (e.g., based on update context metadata for the identified data population) one or more data elements that can be modified by the update tool. These data elements may be displayed for the user, via the user interface, and the method can include receiving, via the user interface, a second user input comprising a selection of one or more data elements to be updated and an update value for each of the one or more data elements.

In some cases, the method further comprises invoking the identified update tool to update the identified data population with the update value for each of the one or more data elements and/or providing an update status indicating a result of invoking the identified update tool.

Another embodiment provides a computer readable medium having encoded thereon a set of instructions executable by a computer to implement a framework for updating data in one or more business objects. In an aspect, the framework comprises a population update engine configured to receive a data population comprising one or more business objects from one or more data sources, and provide the data population to an update tool appropriate for updating one or more data elements. In another aspect, the framework comprises an adapter interface configured to interact with one or more of a plurality of update tools (including, without limitation, the update tool appropriate for the selected set of data) to update the one or more data elements in each of the business objects. In a third aspect, the framework comprises one or more sets of update context metadata, including a first set of update context metadata defining a relationship between the population update engine and each of the plurality of update tools. Optionally, the framework might comprise a user interface for receiving, from a user, input pertaining to the set of data to be updated;

Yet another set of embodiments provides computer systems. An exemplary computer system might comprise one or more processors (which might be incorporated within one or more computers, such as a server computer and/or a client computer) and a computer readable medium having encoded thereon instructions executable by the one or more processors to implement the software framework provided by various embodiments and/or the perform one or more operations in accordance with methods of various embodiments.

BRIEF DESCRIPTION OF THE DRAWINGS

A further understanding of the nature and advantages of some embodiments of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

FIGS. 3A, 3B and 3C are exemplary screen displays illustrating interfaces for configuring a population selection engine, in accordance with various embodiments of the invention.

FIG. 5 is an exemplary screen display illustrating a user interface for selection a set of data to be processed by a business application, in accordance with various embodiments of the invention.

DETAILED DESCRIPTION OF CERTAIN EMBODIMENTS

Figure 1A:
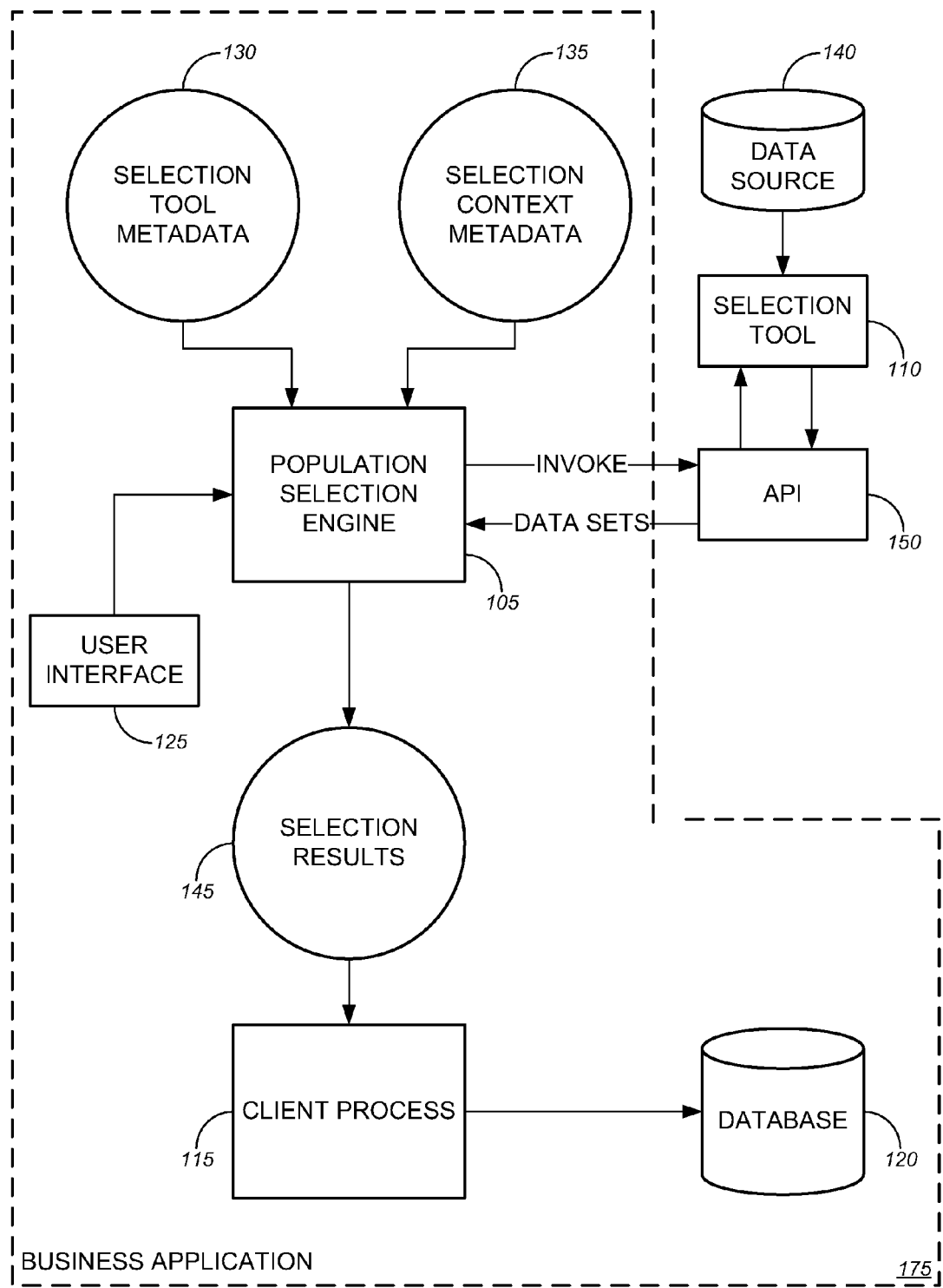
FIGS. 1A and 1B are block diagrams illustrating a software framework for selecting data to be processed by a business application, in accordance with various embodiments of the invention.

While various aspects of certain embodiments of the invention have been summarized above, the following detailed description illustrates a few exemplary embodiments in further detail to enable one of skill in the art to practice the invention. In the following description, for the purposes of explanation, numerous specific details are set forth in order to provide a thorough understanding of various embodiments the present invention. It will be apparent, however, to one skilled in the art that other embodiments of the present invention may be practiced without some of these specific details. In other instances, well-known structures and devices are shown in block diagram form. Several embodiments of the invention are described below, and while various features are ascribed to different embodiments, it should be appreciated that the features described with respect to one embodiment may be incorporated with another embodiments as well. By the same token, however, no single feature or features of any described embodiment should be considered essential to the invention, as other embodiments of the invention may omit such features.

In an aspect, some embodiments of the invention facilitate the processing of data with a business application. In particular, certain embodiments can be used to select, for processing, a data population from a larger set of data in a data source, and feed the selected data to a process in a business application (or any other suitable application). Beneficially, the population selection techniques of various embodiments can allow an application developer and/or user an enhanced degree of flexibility in determining how to select data for a particular process.

As noted above, there are a wide variety of business applications available, and particular embodiments of the invention can be used by any such application, as well as other types of software that require data processing and/or selection. The term "business application process" (sometimes referred to herein as a "client process" of the population selection engine, or merely as a "process"), as used herein, means any type of process, operation, or series of operations performed on a data population by such an application. A business application process might, for example, be used to import data into a business application (and/or a database used by the business application), to modify or update data already in such a database, to provide decision support functions, to generate reports, and/or the like. Virtually any function of a business application can be implemented as a business application process.

Many business applications are designed to process data in a variety of formats, including without limitation, data from a flat file, spreadsheet, etc. (which might need to be imported into the business application and/or a database used by the business application), data already in a database (which might need to be modified by the process, etc.), and/or a variety of other types of information. Certain embodiments can allow the user to select the appropriate data selection tool for the type of data to be processed and/or for the process to be used. In some embodiments, one or more pre-configured data selection tools may be provided with the business application, while in other embodiments, the user (and/or a developer) can be given the option to interface with third-party selection tools that may be more appropriate for the user's specific requirements.

Consider, for example, a business application that is configured to manage data about an educational institution, such as a university. The business application might be configured to store (e.g., in a relational database) data about various students, employees, etc. If an administrator desires to add a new group of students to the database, the administrator might have a spreadsheet with biographical information about the new students—for instance, each row in the spreadsheet might represent a data record for a particular spreadsheet, and each column in the spreadsheet might represent a particular data element (name, address, SAT score, undergraduate GPA, etc.) for each student. The administrator, then, can use a spreadsheet-specific selection tool to select the appropriate students from the spreadsheet (based, perhaps, on the value of a particular data field in each student record in the spreadsheet) to be processed by the business application and inserted into the database.

In this example, the administrator might also want to update several student records already in the database (for example, to indicate that certain students have qualified for financial aid). In that case, the administrator might need to use a selection tool that is configured to select data from a table in the database (using, for example, structured query language ("SQL") statements to select the appropriate population of students. The selected student records can then be processed to update those records to indicate that financial aid has been awarded, using a standard process within the business application.

As this example illustrates, some embodiments of the invention can be used to provide a user with a variety of data selection tools appropriate to the type(s) of data being selected, while still providing a consistent interface with defined processes of a business application. The user is not necessarily limited to a pre-configured data selection tool that is hard coded into the business application. Instead, tools in accordance with certain embodiments of the invention provide the user with flexibility to use one of several defined data selection tools (and, in some cases, even to interface with additional selection tools written by the user or a third party) to select data to be processed, allowing the user to choose the best selection tool for the type of data to be selected.

I. Population Selection Framework

Figure 1B:
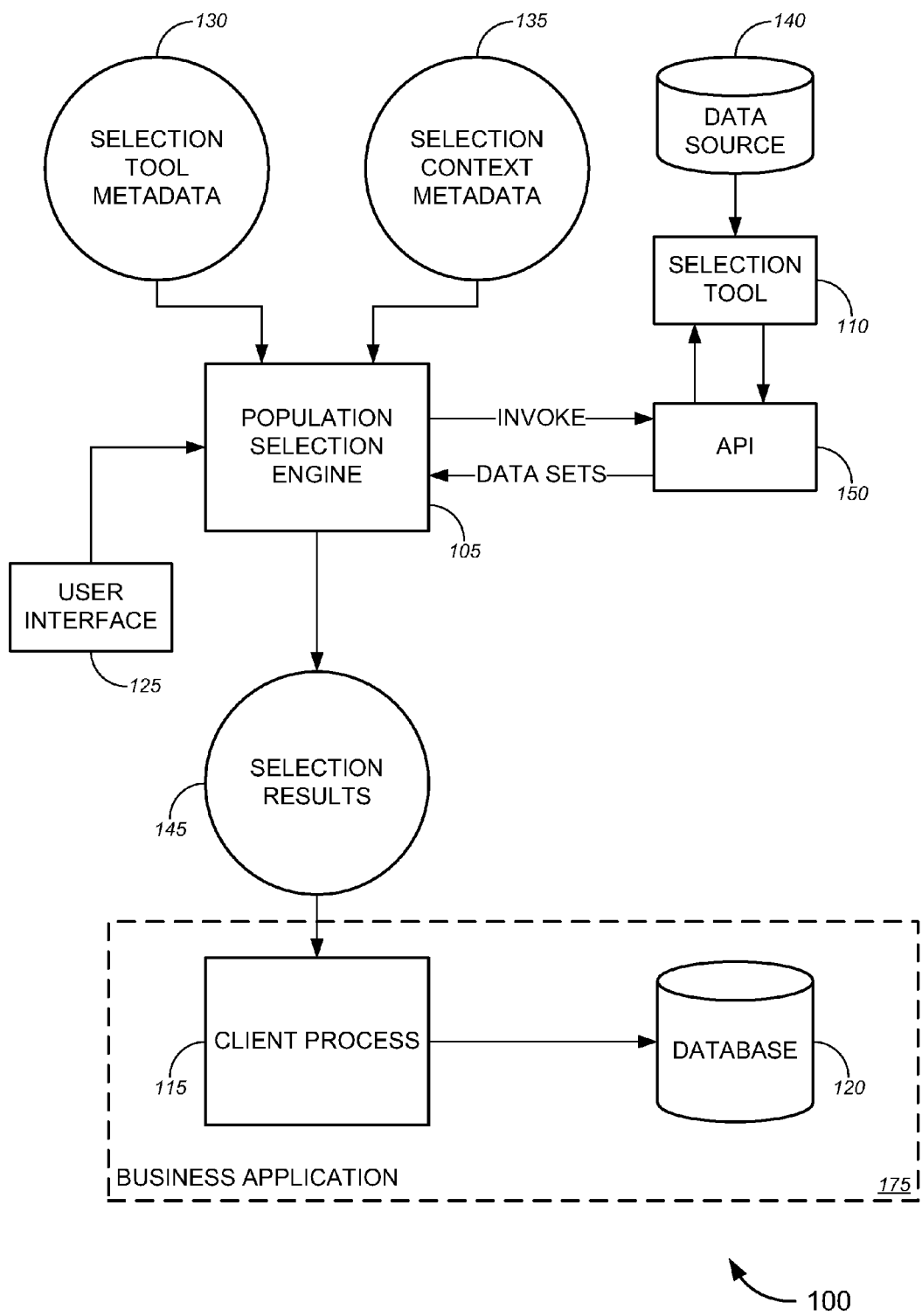

In an aspect, one set of embodiments provides this flexibility through a robust software framework for selecting a data population to be processed. FIGS. 1A and 1B illustrate a population selection framework 100 in accordance with some embodiments of the invention. In the illustrated embodiment, the framework 100 comprises a population selection engine 105 and one or more selection tools 110. As used herein, the term "population selection engine" is used to refer to any software tool, application and/or component that can be used to select data for processing by a business application, and/or optionally, to format or convert the data for use by the process. In this way, the population selection engine 105 can serve as an intermediary between a predefined process in a business application and a set of data that might otherwise be unusable by the process.

In an aspect, the population selection engine 105 can use a variety of selection tools 110 to interface with a variety of data sources to select and/or obtain the data for processing. As used herein, the term "selection tool" means any type of software tool, application and/or component that is configured to access a data source, select data from the data source, and/or provide the data to the population selection engine 105. Examples of selection tools include, without limitation, a SQL query tool (which might be provided by the business application and/or the RDBMS for the database) that can be used to query a database to select data sets, a spreadsheet selection tool that can be used to interface with a spreadsheet (and/or a spreadsheet application) to select data from the spreadsheet, a spreadsheet application itself, a standalone data selection application such as a flat file selection tool that can be used to parse a text (or other type of) file to select data, an equation engine that can be used to allow a user to develop a formula for selecting data sets from a variety of data sources (including database tables, etc.), and the like.

Hence, the population selection engine 105 is configured to interface both with a selection tool 110 and with a client process 115 in a business application 175, which may be used to update a database 120 that is used by the business application 175. The framework 100 might also comprise a user interface (which might be a graphical user interface provided by the business application 175, by the selection tool 105 itself, etc.) In some cases, the user interface 145 is provided as a web interface (that is, a set of one or more web pages served by a web server and/or application server and displayed by a web browser on a client computer, as described in more detail below).

The operation of the population selection engine 105 is described in further detail below; in general, however, the population selection engine 105 invokes a selection tool 110 based, in some cases, on user input received via the user interface 145. The selection tool 110 is configured to select one or more sets of data (referred to herein as a data "population") from a data source 140 and return that data population to the population selection engine 105. The population selection engine 105, then, provides the selection results (which include the selected data sets, perhaps after conversion and/or formatting, as described in further detail below), to the client process 115 in the business application 175, which processes the selected data sets, optionally updating a database 120 used by the business application.

The data source 140 can be any of a variety of data sources, including without limitation a database and/or database table (which, in some cases, might be the database 120 used by the business application 175), a spreadsheet, a flat file, a data store for a separate application (such as an email application, etc.), and/or any of a variety of data sources. In fact, one benefit of certain embodiments is the wide ranges of different data sources that can be used to obtain data for processing by the business application 175—using an appropriate selection tool 110, virtually any type of data source may be supported.

Although only one selection tool 110 and client process 115 are depicted in FIGS. 1A and 1B, a single population selection engine 105 can support any number of either of these components. It is often the case, however, the selection engine 105 needs to be configured to operate properly with a particular selection tool 110 and/or client process 115. Accordingly, in some embodiments, the framework 100 includes metadata that defines how the population selection engine 105 interacts with one or more selection tools 110, as well as one or more client processes 115. Hence, in an aspect, the framework 100 includes a container for storing one or more sets of selection tool metadata 130 (each of which pertains to one of the selection tools 110 defined to the population selection engine 105) and a container for storing one or more sets of selection context metadata 135 (each of which pertains to one of the client processes 115 defined to the population selection engine.)

The term "container" is used herein to mean any sort of storage mechanism that can be used to store metadata and/or specify the format of the metadata. In an aspect, the container for a type of metadata might provide an abstract template to which the stored metadata should adhere. In other words, the containers implemented by the population selection framework might serve as object classes from which actual sets of metadata can inherit properties (such as XML tags, etc.). In a set of embodiments, for example, a particular type of selection tool might be required to have a set of selection tool metadata with particular characteristics, and the container can be used to ensure that the metadata complies with these requirements. The container can also be used to inform a display of the metadata in a user interface (e.g., by providing data labels, etc.). Hence, in a sense, the framework 100 can be considered to include the metadata itself, as the container is used to provide structure and/or storage for the metadata, which is used by the population selection engine 105 to interface with the selection tools 110 and/or client processes 115.

Each set of selection tool metadata 130 defines, within the population selection engine 105, a particular selection tool 110. The metadata 130 can include a variety of information, including without limitation information, a name for the tool, information about an implementation class adapter (sometimes referred to herein as an "application class adapter" and described further below) used by the selection tool 110, a maximum number of data sets to return with the selection tool 110 (which can be used, inter alia, to accommodate limitations imposed by the selection tool 110 itself and/or the population selection engine 105), whether a preview feature (described further below) is enabled by the selection tool, and if so, a maximum number of data sets to display in the preview. In some embodiments, the selection tool metadata 130 might also specify labels to be provided by the user interface 125 of the population selection engine 105 when the selection tool 110 is used (merely by way of example, to allow the user to select data fields in the data source for filter criteria). If the selection tool 110 is accessible via URL, the metadata might also include information about how to access the selection tool 110 by URL (either to invoke the tool or to edit internal parameters of the selection tool 110, e.g., by storing a URL to the appropriate resource for editing such parameters).

The selection tool metadata 130 might also comprise information that is specific to the type of selection tool 110 being defined by the metadata 130. For example, if the selection tool 110 is a SQL query-based tool, the selection tool metadata 130 might include information about one or more SQL views to use for the query, and/or the like. This can force the selection tool to provide all necessary fields in the selection population returned as a result of the SQL query. As another example, if the selection tool 110 is a file-based tool and/or an external application, the metadata 130 might include information about the location of the tool 110, how to invoke the tool 110, what file support is provided (e.g., either a location of a hard-coded data source file, a parameter indicating that the user should be provided with a facility to choose the data source file, and/or the like.

Each set of selection context metadata 135 provides information about a particular client process 115 defined by that set of metadata 135. For example, if the client process 115 is a batch process, the selection context metadata 135 might identify the batch process (e.g., provide information about how to access and/or invoke the batch process). If the client process 115 is an interactive process, the business application 175 might a set of display components (which could be user interface widgets, windows, web pages, web pages components, etc.) that can be used to interact with the process, and the selection context metadata 135 might specify identify the display components (such as, for web components, by URL). (In this way, the user interface 135 of the population selection engine 105 can be used to visually integrate for the user the population selection engine-specific portions of the user interface 125 with the interface to the client process 115. The selection context metadata 135, in an aspect, might specify which selection tools 110 are allowed to select data for the client process 115 (for example, if there is a known limitation in the client process 115 that would prevent the use of a particular selection tool 110). Similarly, access control can be implemented on a per-tool 110 basis for a particular client process 115, e.g., by reference to an access control scheme of the business application 175, and such access control parameters can be specified by the selection context metadata 135.

In a set of embodiments, the selection context metadata 135 for a particular client process 115 also includes information specifying how the client process 115 needs to receive data. Merely by way of example, if the client process 115 requires certain data fields in each data set for processing, the selection context metadata 135 might specify these required fields (e.g., either by specifying the data fields by name or by referencing a database record that specifies the required data fields). There might also be optional data fields (such as a person's name, which may not be needed by the client process 115 but could be useful, for example, in displaying a preview of the selected data), and the selection context metadata 135 might specify these optional data fields as well. In addition, the selection context metadata 135 often will specify a results record, which is a format (e.g., a database record having particular database fields) for the data sets to be processed by the client process 115. This results record can be specified, inter alia, by referencing a target record in a database. In some cases, the data fields will need to be mapped to the results record (and/or otherwise formatted or converted), and the selection context metadata 135 might also comprise information about how the data fields should be mapped, formatted, converted, etc. Merely by way of example, the selection context metadata 135 might define a data conversion fill to apply when mapping a particular data field in a selected data set to a field in the results record (a trivial example, is a conversion of a temperature value from degrees Celsius to degrees Fahrenheit, although much more complex conversion filters are possible as well.

In some embodiments, the framework 100 includes an application programming interface ("API") 150 that provides for consistent communication between the population selection engine 105 and a variety of selection tools 110. In an aspect, the API might comprise an application class adapter that includes a set of exposed methods that the selection tool must implement to interface with the population selection engine. In an exemplary embodiment, the following methods (among others) may be implemented: a LaunchTool( ) method, which can be used by the population selection engine 105 to launch (invoke) the selection tool 110; a LaunchToolValid( ) method, which returns a value indicating whether the current user (or process) has sufficient access rights and can be used by the population selection engine 105 to ensure that the user (or process) has sufficient access rights to use the selection tool 110 and/or access the data source 140; an OpenQuery( ) method, which can be used by the population selection engine 105 to instruct the selection tool to open and/or validate the selection and/or selection criteria; an ExecuteToRecord( ) method, which can be used by the population selection engine 105 to cause the selection tool 110 to select the desired data sets and return them in an appropriate format for processing (including, for example, as a record in a table in the database 120 or another database, for example); an ExecuteToRowSet( ) method, which can be used by the population selection engine 105 to cause the selection tool 110 to select the desired data sets and return them as a set of rows for processing (merely by way of example, as a temporary set of rows in volatile memory, which might be stored later in a database table); and an ExecuteToHTML( ) method, which can be used by the population selection engine 105 to cause the selection tool 110 to select the desired data sets and return them in an appropriate format for preview by the user (for example, as an HTML string which can be displayed by the user interface 140 in a web browser). In some cases, the filter criteria or search query used to select the data population can be passed from the population selection engine 105 to the selection tool as a parameter, for instance in the ExecuteToRecord( ), ExecuteToRowSet( ) and/or ExecuteToHTML( ) methods. (It should be noted that the described methods are provided for descriptive purposes and should not be considered limiting. Various embodiments might implement other types of exposed methods and in fact might use a different type of API altogether.)

The population selection framework 100 (and/or a portion thereof) may be implemented within the business application 175 and/or may be provided by a standalone application configured to interface with the business application 175. Merely by way of example, in FIG. 1A, the business application 175 includes the population selection engine 105, and metadata 125, 130, while in FIG. 1B, these components are not included within the business application 175 but instead are configured to interface with the business application 175. (In the embodiments illustrated by FIGS. 1A and 1B, the selection tool 110 and data source 135 are depicted as residing outside the business application 175, but in some embodiments, one or both of these components may be incorporated within the business application 175 as well.)

Some embodiments of the invention are implemented in a client-server model. Merely by way of example, the business application 115 might be installed on an application server, and the database 120 might be installed on a database server (and/or on the application server itself). The population selection engine 105 might also be configured to run on the application server. The user interface 125, on the other hand, might be configured to be displayed on a client computer operated by a user. The user interface 125 might be provided by a dedicated client application in communication with the business application and/or population selection engine, and/or, as described elsewhere herein, might be provided as a set of one or more web pages displayed in a web browser on the client computer. The selection tool 110, depending on its nature, might be installed on either the client computer and/or the server computer. In any event, a network might be provided (as described in more detail below) to provide communications between various computers that implement the framework 100.

II. Configuring a Population Selection Engine

Figure 2:
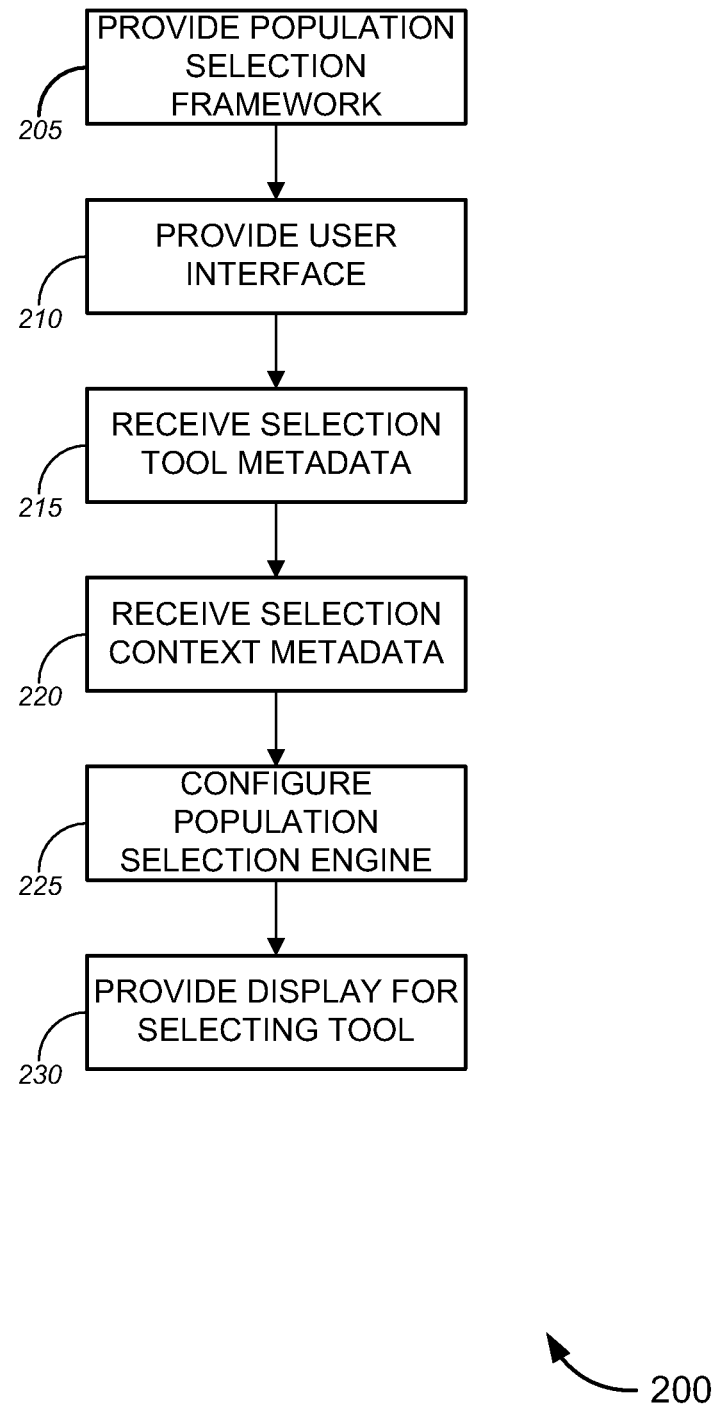
FIG. 2 is a process flow diagram illustrating a method of configuring a population selection engine, in accordance with various embodiments of the invention.

As noted above, in many cases, a population selection engine needs to be configured to operate with a particular selection tool and/or client process. FIG. 2 illustrates a method 200 of configuring a population selection engine. The method 200 comprises providing a population selection framework (block 205), such as the framework 100 described above with respect to FIGS. 1A and 1B, to name one example. In an aspect, providing a population selection framework can comprise one or more of a variety of operations, including without limitation, installing on a computer system a business application (or other application) that includes a population selection framework, providing a user with access to such a framework (e.g., through a business application and/or other application that implements a population selection framework), executing an application that implements such a framework, and/or the like.

The method 200 further comprises providing a user interface from a computer system (block 210). As noted above, the user interface might be provided by the population selection engine itself, from a business application associated with the population selection engine, etc. Also as noted above, some operations might be performed on a server computer, while the user interface might be displayed on a client computer (e.g., as one or more web pages in a web browser on the client computer). The user interface can allow the user to interact with the population selection engine, either to configure the population selection engine, or to use the population selection engine to select data for a client process, as described in further detail below.

At block 215, a set of selection tool metadata is received from the user (e.g., via the user interface). As noted above, in an aspect, the set of selection tool metadata pertains to a selection tool that can be used by the population selection engine for selecting data to provide to a business application. FIG. 3A is an exemplary screen display that illustrates one embodiment of a user interface 300 for receiving a set of selection tool metadata for a SQL-query based selection tool. The user interface 300 includes data fields for the name of the selection tool 305, a description of the selection tool 310, a description of the application class adapter used by the selection tool 315, whether the selection tool should be usable (active) by the population selection engine, one or more SQL views to use for the selection tool 320, a label 325 to display in the user interface of the population selection engine, a maximum number of data sets to return 330, and a maximum number of data sets to preview 335. The user interface 300 also includes a number of fields that specify parameters 340 to use when launching the selection tool. Using this interface 300, a user can provide selection tool metadata to the population selection engine, which receives it from the user interface.

Returning to FIG. 2, at block 220, a set of selection context metadata is received from the user, via the user interface. As noted above, in an aspect, the set of selection context metadata comprises information about a first client process that is implemented by the business application (i.e., a business application process) to process data selected by the selection tool. FIG. 3B is an exemplary screen display that illustrates one embodiments of a user interface 350 for receiving a set of selection context metadata. Using the interface 350, the user can provide metadata about the name of the client process 355 within the business application, as well as display information for the population selection engine's user interface (such as a context name and description), an identification of a process type 360 (which might be a batch process, interactive process, etc.), a status of the client process, such as available to the population selection engine (active) or unavailable (inactive), as well as information 365 about selection tools that can be used to select data for that client process (and any access restrictions imposed on the use of those tools).

FIG. 3C is another screen display illustrating a user interface 375 that can be used to provide metadata defining how the population selection engine should provide data to the client process. The interface 375 provides a data field where the user can specify the results record that the process uses 380 and the fields required by the process 385 (which, in this case, are specified by a required fields record, as described above. The interface 375 also provides data fields 390 for allowing the user to define how the required fields should be mapped to the results record.

Returning once again to FIG. 2, the method 200 further comprises configuring the population selection engine based on the selection tool metadata and the selection context metadata (block 225). Configuring the population selection engine comprises, in an aspect, storing the received metadata and/or reading the metadata upon execution of the population selection engine, so that the population selection engine can properly interact with the defined selection tools and client processes.

Once the population selection engine has been configured to define a particular selection tool and/or client process, the user can use the population selection engine to interface with the defined tool and/or provide data to the defined process. Hence, the method 200 comprises, in some cases, providing (e.g., via the user interface), a display (block 230). The display can be used to allow the user to select a defined selection tool (for selecting a set of data) and/or a defined client process (for processing the selected data). Techniques for selecting and/or processing data are described in further detail below.

III. Selecting Data with a Population Selection Engine

Figure 4:
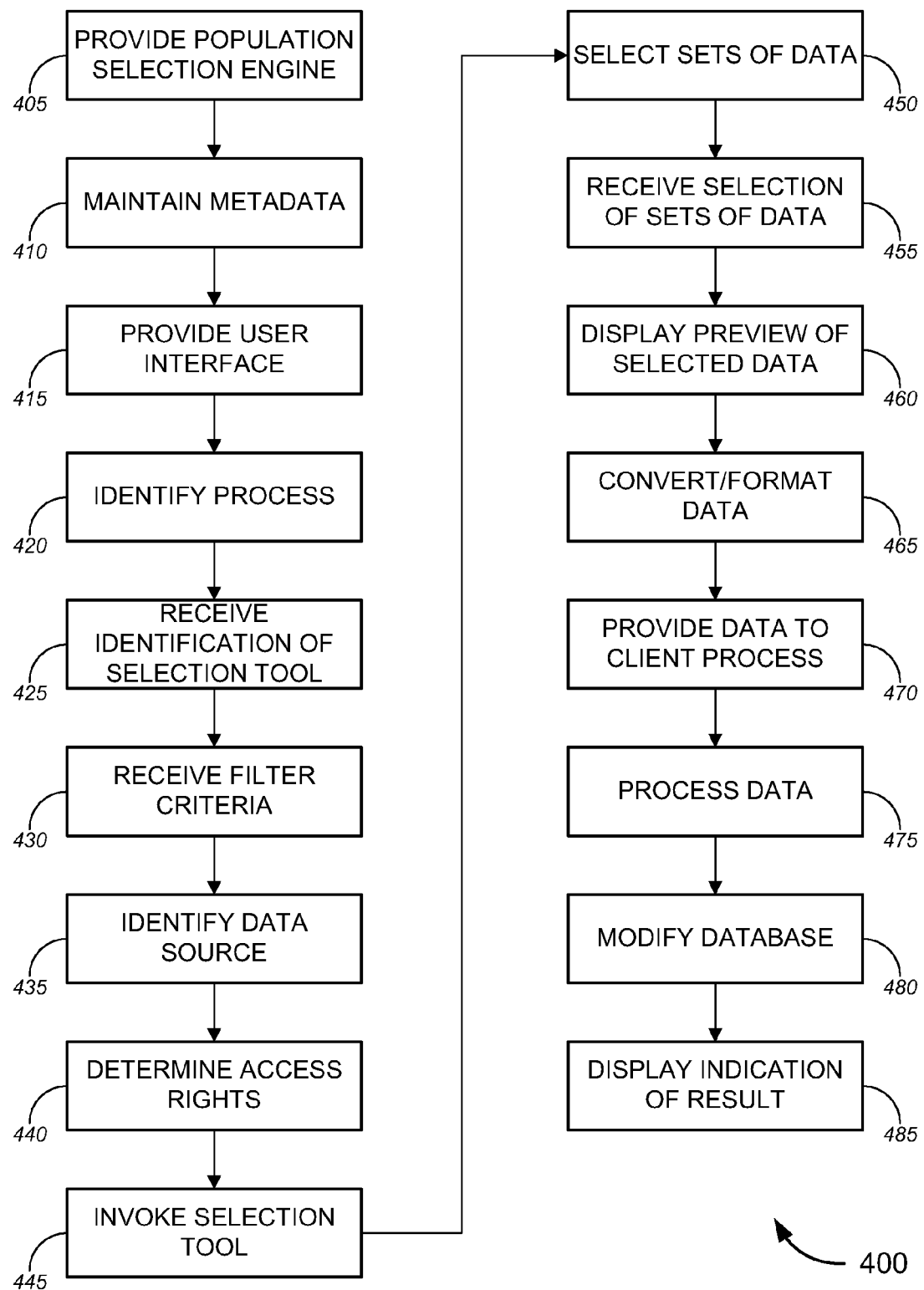
FIG. 4 is a process flow diagram illustrating a method of processing data in a business application, in accordance with various embodiments of the invention.

As noted above, certain embodiments of the invention can be used to select data to be processed by a business application (and, optionally, to process the data with a client process in the business application). FIG. 4 illustrates a method 400 of selecting and/or processing data, in accordance with one set of embodiments. (The method 400 is described herein generally with respect to the framework 100 of FIGS. 1A and 1B; it should be appreciated, however, that the method 400 is not limited to any particular structural implementation or software architecture; similarly, the framework 100 of FIGS. 1A and 1B can operate in accordance with the method 400, as well as other modes of operation.)

The method 400 comprises providing, at a computer system, a population selection engine (block 405). As noted above, in an aspect, a population selection engine can be used to select data (via a selection tool, for example) and/or format/convert data to be processed by a business application. Providing a population selection engine can comprise, inter alia, installing on a computer system a software application that comprises a population selection engine, configuring a population selection engine (as described above with respect to FIG. 2, for example), providing a user with access to a population selection engine (including, for example, executing an application that implements a population selection engine), and/or the like.

The method 400 further comprises maintaining metadata at the computer system (block 410). The metadata, includes, in an aspect, a set of metadata for each of one or more selection tools that are available to the population selection engine and/or a set of metadata for each of one or more client processes to which the population engine can provide data. Some examples of such metadata are described above. In a particular aspect, as noted above, a population selection framework may comprise containers for storing metadata, and maintaining metadata can comprise creating the metadata, storing the metadata in the container(s), updating the metadata, accessing the metadata, and/or the like.

The method 400 also comprises providing, from the computer system a user interface (such as the user interface 125 described above with respect to FIGS. 1A and 1B) for the user to interact with the population selection engine (block 415). An example of such a user interface 500 is illustrated with respect to FIG. 5. The user interface 500 can be used to allow a user to operate the population selection engine to select data and provide the data to a client process. The exemplary interface 500 includes a data field for the user to choose a desired selection tool 505 to be used select data sets to be processed, a data field for the user to identify a name of a defined query 510 to be performed by the selection tool, an option to launch a query manager 515, which can be used to edit the identified query, and an option to preview the selected data sets 520. The exemplary interface 500 also includes a set of display components 525 from the selected client process (which are visually integrated, as described above, on the same web page as the user interface for the population selection engine itself), which allow the user to provide process-specific parameters to be used when processing the selected data.

Returning to FIG. 4, at block 420, the method 400 comprises identifying the client process for which data is to be selected and/or specifying process-specific parameters for processing of data with the process (for example, by reference to FIG. 5, using the display components 525 for the process, as specified by the selection context metadata). In some embodiments, this might include receiving a selection of a client process from among several defined client processes, which can be displayed by an interface similar to the interface 500 of FIG. 5. In other embodiments, the client process might be identified in other ways. Merely by way of example, in one implementation, the user might invoke the client process from within the business application, and the business application then might invoke the population selection engine to select data for the process, which already has been selected by default by the business application.

At block 425, the method comprises receiving, via the user interface, identification of a selection tool to be used to select data to be process with the business application (for example, by receiving input from the appropriate data field 505 on the interface 500 of FIG. 5).

Optionally, the method might comprise receiving a set of filter criteria to be used to select data from the data source (block 430). This filter criteria might be received from the user and/or via the user interface. Merely by way of example, the user interface might provide an input facility (such as the data field 510 on FIG. 5 and/or a query manager, which can be used to assist the user in creating a SQL statement to use as a filter criteria) for the user to provide a SQL statement (or statements) that specify a query to be performed by the selection tool to identify data sets to be selected. As another example, the user interface might be configured to allow the user to specify an algorithm/formula that should be provided to a search tool to select data from a spreadsheet, a search criteria for searching a flat file, etc.

At block 435, the method comprises identifying a data source (such as a data source 125 described above with respect to FIGS. 1A and 1B), which comprises the data to be processed with the business application. In some cases, the data source might be identified based on input received from the user (e.g., via the user interface). Merely by way of example, if the data source is a spreadsheet, flat file, etc., the user might identify the location of the data source (e.g., by typing in a file path, by browsing a directory structure, etc.). In other cases, the data source might be identified with a different technique. Merely by way of example, in some cases, the selection tool metadata for the chosen selection tool might specify the data source that is to be used with that selection tool.

Optionally, the method 400 might include determining whether the user has sufficient access rights to use the chosen selection tool and/or to access the chosen data source (block 440). As noted above, in some cases a selection tool API will include a method that allows the population selection engine to inquire of the selection tool whether the user has sufficient access rights. Hence, determining whether the user has sufficient access rights might comprise relying on an access control scheme of the selection tool. Merely by way of example, the population selection engine might be configured to call the appropriate method in the API, with the user's ID (or other credentials) as a parameter, and the method might return a Boolean value indicating whether the user is allowed to use the selection tool and/or access the data source. In other embodiments, the population selection engine might rely on its own access control scheme (e.g., the population selection engine might have its own authentication and/or authorization modules). In yet other embodiments, the population selection engine might rely on the access control scheme of the business application itself (for example, in embodiments in which the population selection engine is incorporated within the business application and/or accessed via the business application.)

At block 445, the selection tool is invoked by the population selection engine. In some embodiments, the selection tool is invoked based on some or all of the metadata maintained by the population selection engine. Merely by way of example, the metadata, as noted above, might specify a location of the population selection engine, a method of invoking the population selection engine, etc. In some cases, the selection tool is first launched using an API, such as by using a LaunchTool( ) method (or a similar method) and is then invoked via the API (using, for example, an ExecuteToRecord( ) or ExecuteToHTML( ) method (or similar methods). As noted above, in some cases, the invocation of the selection tool is also based at least in part on user input (such as, for example, the user's choice of which selection tool to use, the filter criteria provided by the user, etc.) In a particular embodiment, the filter criteria is passed to the selection tool as a parameter to the invocation method. The technique for invoking the selection tool is discretionary, however, so long as the selection tool is successfully invoked and any necessary filter criteria are provided to the selection tool.

At block 450, the selection tool selects one or more sets of data in the data source, in accordance with the instructions received from the population selection engine (which might include, for example, a filter criteria to apply). The nature of the sets of data generally will depend on the type of selection tool and/or data source chosen. For example, if the data source is a database table, the data sets might comprises records from the table (and/or particular data fields from those records), while if the data source is a flat file, the data sets might comprise strings of data (which might be delimited in some fashion). Similarly, the techniques used by the selection tool to select sets of data from the data source will also generally depend on the nature of the data source and/or selection tool. Given the wide variety of data sources and selection tools that can be supported by the population selection engine, there is a correspondingly wide variety of data selection and gathering techniques that might be used. In one aspect, the population selection engine is agnostic to the techniques used by the selection tool to select and/or gather data sets, since the population selection framework serves to isolate the population selection engine from these implementation-specific details. More precisely, in a set of embodiments, when the population selection engine invokes the selection tool, it can expect to receive the data sets from the selection tool in a specified format, irrespective of the techniques used by the selection tool to select and/or gather the data sets.

The selection tool then provides the selected data to the population selection engine, in the format specified by the invocation of the selection tool, and the population selection engine receives the selected data sets (block 455). For example, if the ExecuteToRecord( ) method is used to invoke the selection tool, the method might return the data sets to the population selection engine as a database record and/or set of database records. As another example, if the ExecuteToHTML( ) method is used to invoke the selection tool, the data sets might be returned as an HTML-formatted string suitable for display by the population selection engine in a web browser. In some cases, receiving the data sets at the population selection engine might comprise receiving the actual data. In other cases, receiving the data sets might comprise receiving references or pointers to the data sets in a database (such as, for example, when the data source is the same database that stores information for the business application).

In some cases, the population selection engine may be configured to display (e.g., via the user interface) a preview of the selected data sets (block 460). This display can provide the user with a preview of the data to be processed before the user has to commit to actually processing the data. In this way, the user can ensure that the correct data sets have been selected. If necessary, the user can abort the processing at this point, revise the filter criteria, and re-execute the selection process to select more appropriate data for processing.

If necessary, the received data sets can be reformatted and/or otherwise converted by the population selection engine into a format required by the client process at the business application. As noted above, in some embodiments, the selection context data for a particular client process might specify that data from a data source needs to be mapped to particular data fields or placed in a particular format for processing by the process. In such cases, the population selection engine, by reference to the metadata, will reformat or convert the selected data sets as necessary before (or while) providing the data to the client process (block 465).

At block 470, the selected data sets are provided to the client process. Once again, the way in which the data sets are provided to the process depends on the nature of the data sets and the nature of the client process. In some cases, if the data sets reside in database tables within the business application (or that are accessible by the business application), providing the data sets might simply comprise providing references or pointers to the data sets. In other cases (such as when the data sets are selected from a data source outside the business application), the data sets might be stored in a result record in database table accessible by the business process. In yet other cases, the data sets might be fed as raw (or formatted) data directly from the population selection engine to the client process.

The client process at the business application then processes each of the selected data sets (block 475). In some cases, the client process is called or invoked by the population selection engine. In other cases, the process might already be running. The client process, as noted above, can be configured to process the selected data sets either interactively and/or in a batch mode. The operations performed by the client process in processing the data sets vary widely depending on the nature of the client process. Those skilled in the art will recognize that a typical business application can perform a variety of processes (which might be pre-defined by the application, defined by the user, etc.) on a data set, and any of such processes can be supported by particular embodiments of the invention. In some cases, the processing will modify a database used by the business application (block 480), such as by creating new records in a table of the database, modifying existing records, etc. Once again, those skilled in the art will appreciate that a business application process can perform a wide variety of operations that will modify a database (and/or tables, rows, etc. therein), and that any of such operations might be implemented by the client processes for which the population selection engine selects data. Merely by way of example, if the data sets are selected from a data source external to the database, modifying the database might comprise creating one or more new records in the database, corresponding to each of the selected data sets. On the other hand, if the database is the data source, then the client process might modify the database by updating the records that comprise and/or correspond to the selected data sets.

In some embodiments, the method 485 is configured to display (e.g., via the user interface) an indication of a result of the processing. In some cases, this indication might simply be a notice that processing has successfully completed, a warning about any data sets that were not successfully processed, etc. In other cases, the indication might provide additional details (including, for example, the number of data sets processed, number of database records updated or created, etc.). In some cases, displaying the indication of a result of the processing might comprise writing the indication to a log file, emailing the indication to an email address of the user or another administrator, etc.

IV. Population Update Framework

Another set of embodiments provides flexibility in updating business objects (usually, although not necessarily, in the context of a business application) through a robust software framework for updating a data population. In an aspect, such embodiments can use the population selection tools described above to select business objects to be updated. In another aspect, the update framework of various embodiments may incorporate (or be incorporated within) a population selection framework as described above, and/or an integrated software application may perform both data population and update functionality. (As used herein, the term "business object" refers to any collection of data that can be processed using the tools described herein. Business objects include, but are not limited to, database tables, database records, instances of object-oriented classes (e.g., Java classes), text files, spreadsheet files, and/or the like.)

Figure 8A:
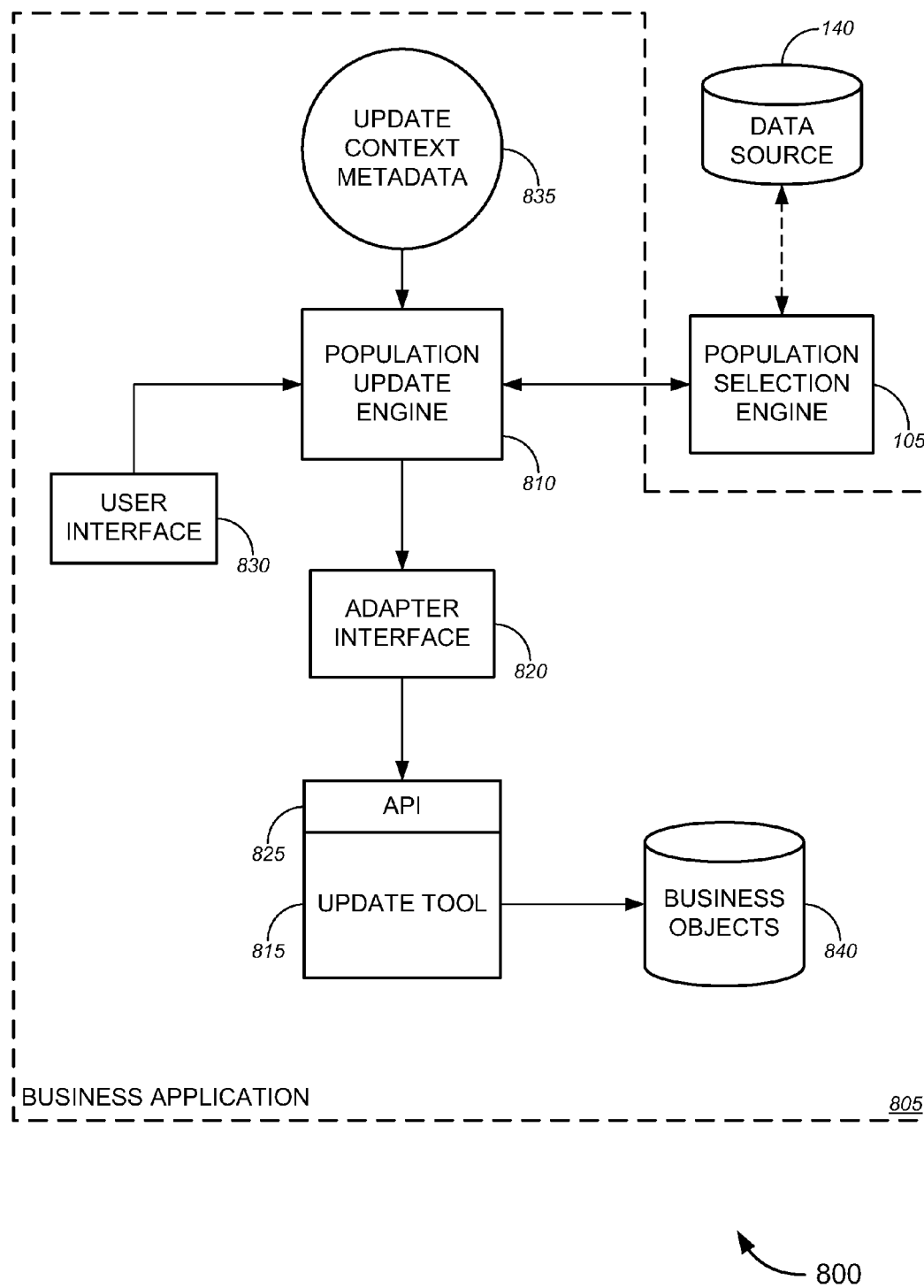
FIGS. 8A, 8B and 8C are block diagrams illustrating a software framework for updating data to be processed by a business application, in accordance with various embodiments of the invention.
Figure 8B:
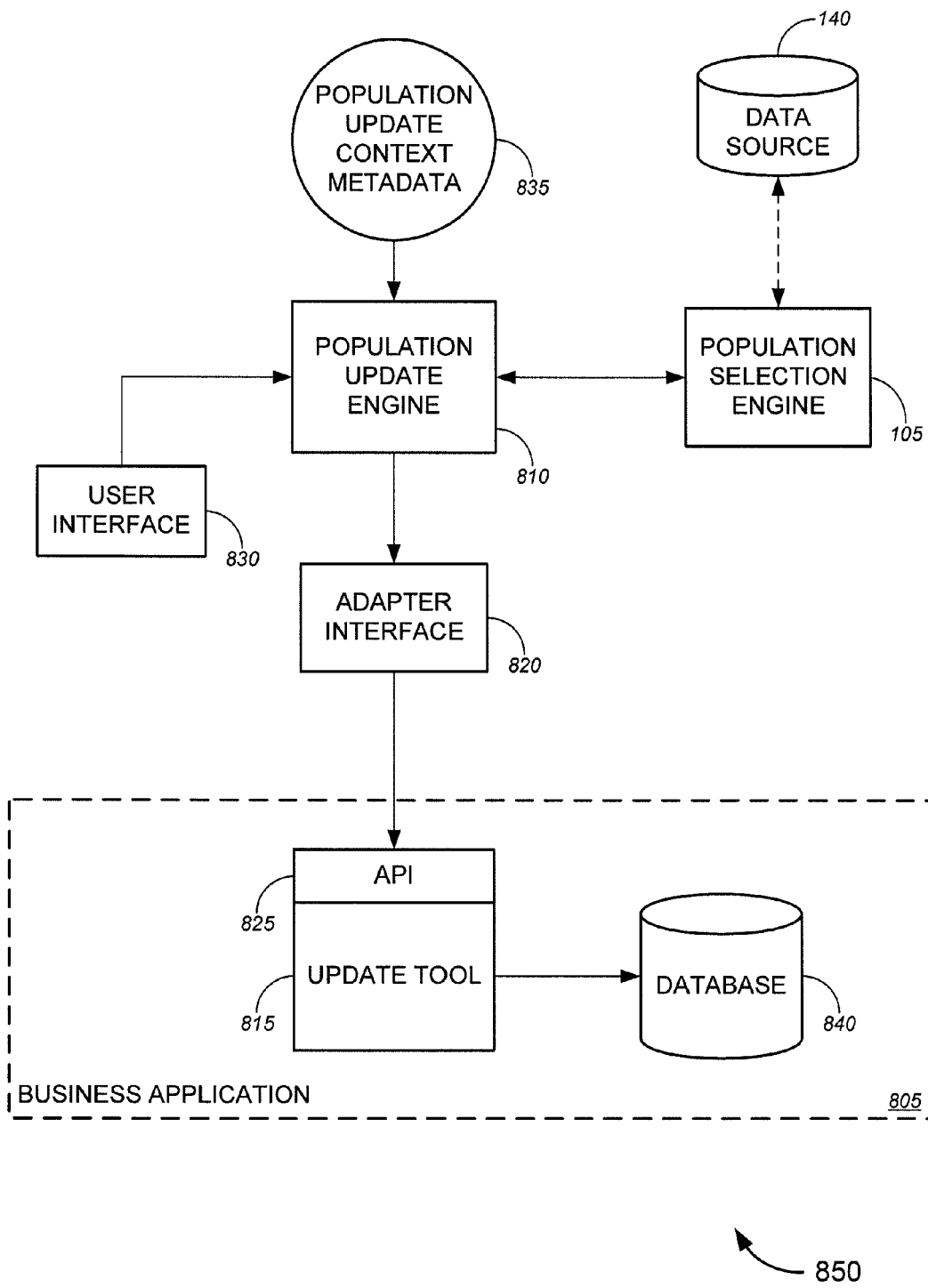
Figure 8C:
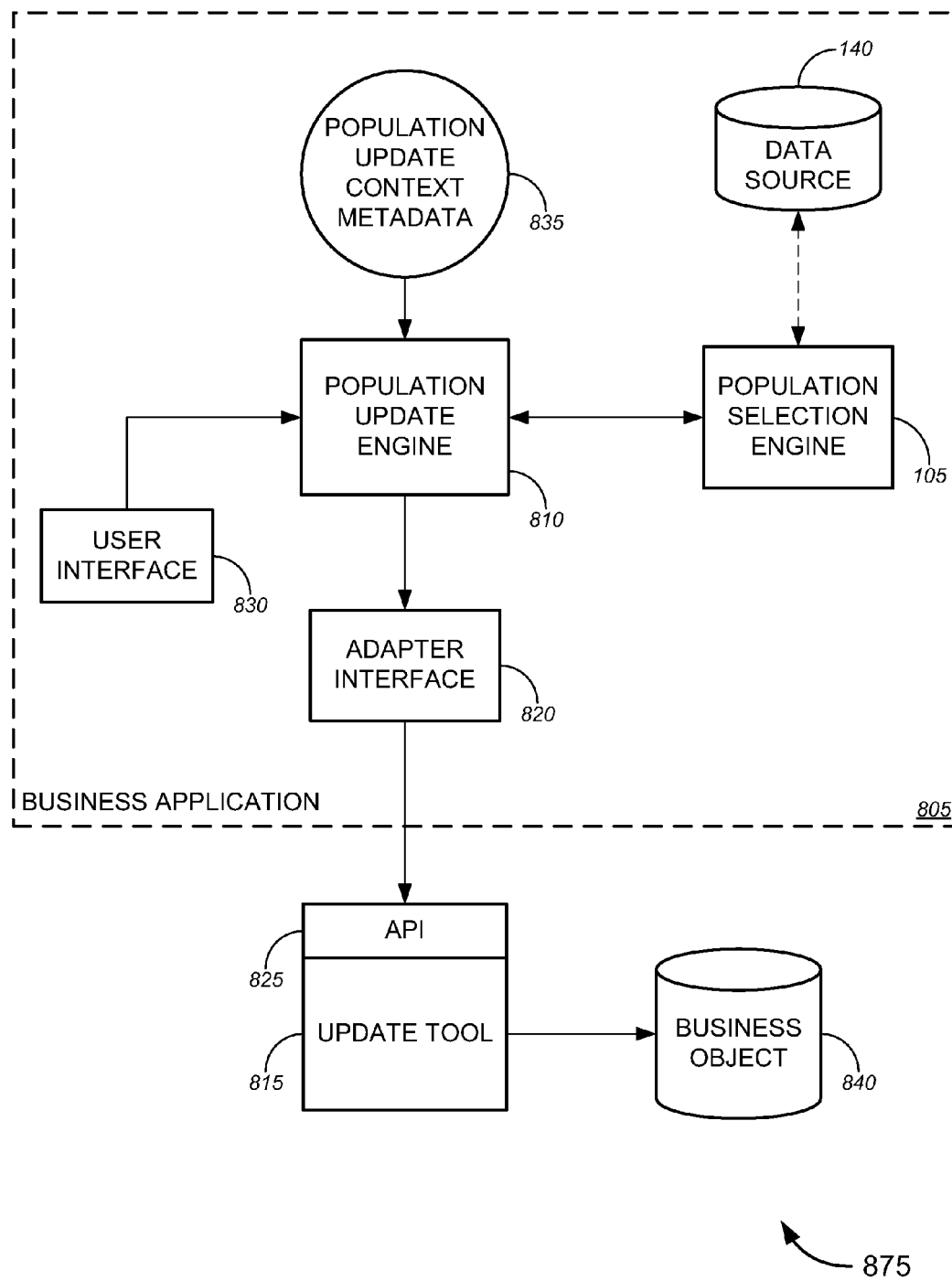

In some cases, update utilities provided by certain embodiments may be implemented in conjunction with a business application and/or may be incorporated within a business application. There are a variety of possible configurations. FIGS. 8A-8C illustrate just a few possibilities, although one skilled in the art will recognize that other arrangements are possible within the scope of the invention.

FIG. 8A, for example, illustrates a population update framework, implemented as an update utility (referenced generally as 800). In FIG. 8, the update utility 800 is implemented within a business application. 805, in accordance with some embodiments. In the illustrated embodiment, the framework 800 comprises a population update engine 810. As used herein, the term "population update engine" is used to refer to any software tool, application and/or component that can be used to update data within a business object (e.g., in the context of a business application), and/or optionally, to modify, format and/or convert the data for storage. In this way, the population update engine 810 can serve as an intermediary between a selection tool that selects data to be updated and an update tool 815 that actually updates the data. In some cases, as in the embodiment illustrated by FIG. 8A, the selection tool may include a population selection engine 105 and/or population selection framework, as described in detail above.

Hence, in one aspect, embodiments can be used to provide interoperability between selection tools and update tools 815 that previously were inoperable, by providing a standardized framework 800 for this operability. Merely by way of example, as noted above, tools provided by certain embodiments can extend the logic and/or functionality of business applications outside the traditional database tables used by the business application, while in another aspect, these tools can be used to provide more flexible techniques for modifying data within such database tables.

In an aspect, the population update engine 810 can communicate with a population selection framework (and, in particular, the population selection engine 105) to interface with a variety of data sources 140 to select and/or obtain the data for processing (for example, in the manner described above). More generally, however, within the context of the population update tools described in this section, the population selection engine 105 can be any type of software tool, application and/or component that is configured to access a data source, select data from the data source, and/or provide the data to the population update engine 810. Several embodiments of the population selection engine 105 are described above in Sections I-III.

The population update engine 810 is configured to interface both with the population selection engine 850 and with the update tool 815. In one aspect, the population update engine 810 employs a plurality of adapter interfaces 820, each of which is configured to interact with an API 825 (or other inter-process/inter-application communication facility) provided by the update tool. By using an adapter interface 820 that is customized for a particular update tool 815, the population update engine 810 itself can be generalized to operate with a number of update tools 815.

One benefit of certain embodiments is that a wide variety of update tools 815 (and, correspondingly, a wide variety of business objects 840) can be supported by the update utility 800. Such update tools can include, without limitation, desktop applications (such as spreadsheet programs, which can treat a spreadsheet file as a business object to be updated), standard and/or proprietary data access utilities, database management systems (and/or procedures within those systems), business applications, and/or the like. Merely by way of example, the business application processes described above in Sections I-III can be considered update tools 815 in accordance with some embodiments.

In some embodiments, the framework 800 might also comprise a user interface 830 (which might be a graphical user interface provided by the business application 805, an interface provided by a standalone software application that implements the framework 800 and/or a selection engine 105, and/or the like.) Similar to the interface for the population selection framework described above, the user interface 845 may be provided as a web interface (that is, a set of one or more web pages served by a web server and/or application server and displayed by a web browser on a client computer, as described in more detail below).

The framework 800 also provides for update context metadata 835, which an be stored in a container, similar to the metadata described above in Sections I-III. The update context metadata 835 can serve any of several functions in the operation of the update utility 800. A first type of update context metadata 835 defines a relationship between the population update engine 810 and each of the available update tools 815. In particular, this type of metadata 835 identifies an appropriate adapter interface 820 for the update tool 815. This type of metadata 835 might also identify the functionality of the update tool 815 (e.g., what types of business objects 840 the update tool can update, and the like).

A second type of update context metadata 835 can be used to describe the properties of business objects 840 themselves. Merely by way of example, in some cases, as noted above, certain data elements in a business object 840 may need to be protected, as their modification may adversely impact the business object 840 of which they are a part. Hence, this second type of update context metadata 835 can be used to define which data elements within a business object 840 are permissible to modify. In addition, this second type of update context metadata 835 might describe the structure of the business object 840 (including, without limitation, a description of the different data elements and their types, specification of access methods, and/or the like), although in some embodiments, the update tool 815 itself is configured to account for this type of information.

In some cases, the update context metadata 835 might also comprise information about available population selection engines 105 and/or tools, including without limitation, metadata that describes how the population update engine 810 should interface with such engines/tools, what data sources 140 are appropriate for such tools, and/or the like. Merely by way of example, in some cases, a user might select a data source from which to select the data population, and update engine might consult appropriate metadata 835 to determine which vehicle (e.g., selection engine 105, selection tool, etc.) should be used to select the data population, based on information in the metadata about that data source and/or data population. In other cases, however, the user might specify which population selection engine 105 and/or selection tool to use. In still other cases, the update engine 810 might use the population selection framework described above as its default (or only) vehicle for selecting data, and the update engine 810 therefore might rely on the population selection engine 105 to determine appropriate selection tools, etc., perhaps in the fashion described above.

The operation of the population update engine 810 is described in further detail below; in general, however, the population update engine 805 interfaces with the population selection engine 850 to select and retrieve data from a data source 840 based, in some cases, on user input received via user interface 830. The population update engine 805 is configured to receive a selection one or more business objects (i.e., sets of data) (referred to herein as a data "population") from a population selection tool 015, based on data from a data source 840 and to provide that data population to the update tool 815 for data updating. (It should be noted that the terms "receive" and "provide" are used broadly in this context to include receiving and/or providing pointers and/or other references to the selected business objects 840, rather than passing the business objects themselves (although this is possible as well).

The data source 140 can be any of a variety of data sources, including without limitation a database and/or database table (which, in some cases, might be the database used by the business application 805), a spreadsheet, a flat file, a data store for a separate application (such as an email application, etc.), and/or any of a variety of data sources. In fact, one benefit of certain embodiments is the wide ranges of different data sources that can be used select a data population to be updated—as noted above, by using an appropriate population selection engine 105, virtually any type of data source may be supported.

It should be noted that, in some cases, the data source 140 may be a data store that holds the business objects 840 to be updated, but this need not necessarily be the case. Merely by way of example, in some implementations, the data source 140 might be a database, and the business objects 840 might be records within the database. By contrast, in other cases, the data source 140 might be the database, but the business objects might be a set of instances of a Java class outside the database. As yet another example, the data source 140 might be a spreadsheet of comprising multiple entries, and the business objects 840 might be records in a database; the entries in the spreadsheet might provide selection criteria defining which records in the database should be selected.

Although only one population selection engine 105 and update tool 815 are depicted in FIGS. 8A and 8B, a single population update engine 805 can support any number of either of these components, for example through the use of appropriate adapter interfaces 820 and/or update context metadata 835 specific to each update tool 815.

As illustrated by FIG. 8A, the update utility 800 (and/or a portion thereof) may be implemented within a business application 805 and/or may be provided by a standalone application configured to interface with the business application 805. Merely by way of example, in FIG. 8A, the business application 875 includes the population update engine 805, and metadata 835, while in FIG. 8B, these components are not included within the business application 805 but instead are configured to interface with the business application 805. As another example, FIG. 8C illustrates a update utility incorporated within a business application 805 but configured to use an update tool 815 outside the business application 805 to update a business object 840 also outside the business applications. A variety of other configurations can be supported as well. Merely by way of example, in the embodiments illustrated by FIGS. 8A-8C, the population selection engine 105 and data source 140 are depicted as residing outside the business application 805, but in some embodiments, one or both of these components may be incorporated within the business application 805 as well.)

The tools provided by some embodiments may be implemented in a client-server model. Merely by way of example, the business application 805 might be installed on an application server, and the business objects 840 might be records in a database installed on a database server (and/or on the application server itself). The population update engine 805 might also be configured to run on the application server. The user interface 830, on the other hand, might be configured to be displayed on a client computer operated by a user. The user interface 830 might be provided by a dedicated client application in communication with the business application 805 and/or population update engine 810, and/or, as described elsewhere herein, might be provided as a set of one or more web pages displayed in a web browser on the client computer. In any event, a network might be provided (as described in more detail below) to provide communications between various computers that implement the framework 800.

V. Configuring a Population Update Engine

Figure 9:
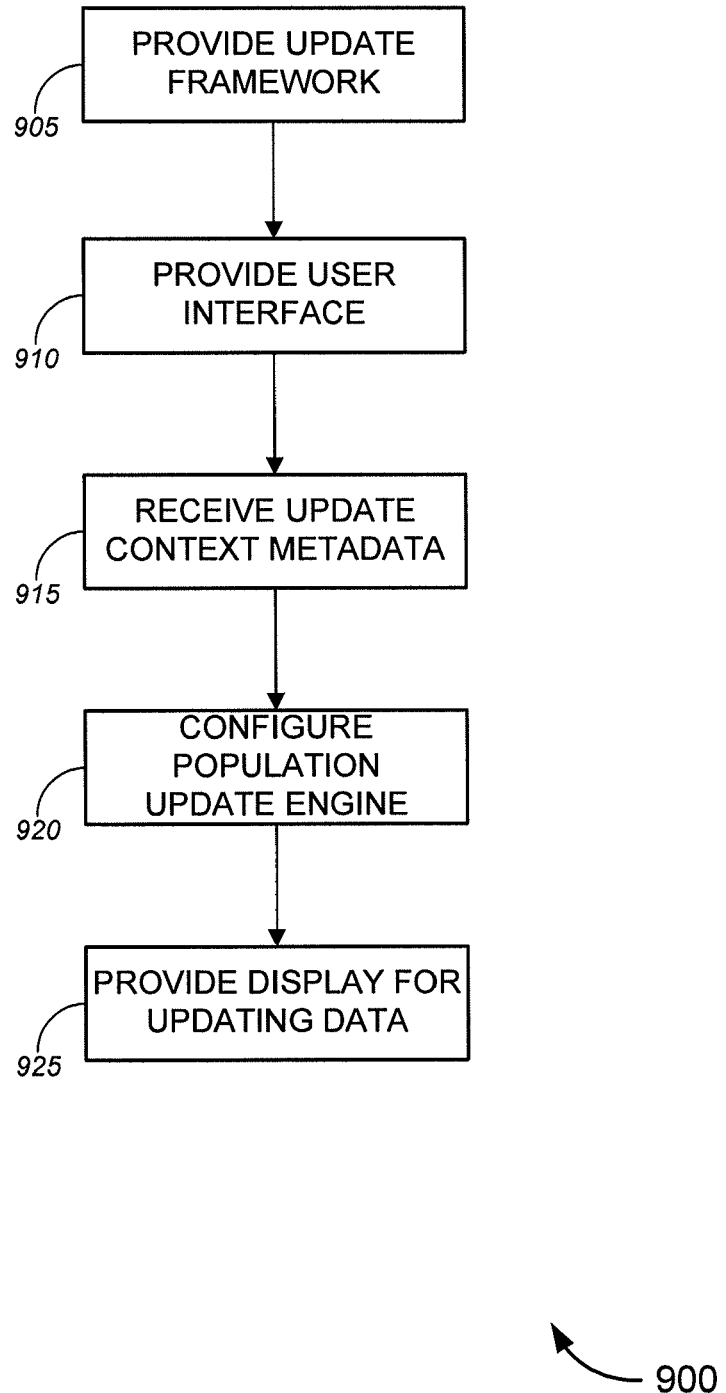
FIG. 9 is a process flow diagram illustrating a method of configuring a population update engine, in accordance with various embodiments of the invention.

Somewhat similarly to the population selection engine described above, an update utility, in many cases, may need to be configured to operate with a particular population selection engine and/or client process. FIG. 9 illustrates a method 900 of configuring a population update engine. The method 900 comprises providing a population update framework (block 905), such as one of the frameworks described above with respect to FIGS. 8A-8C, to name one example. In an aspect, providing a population update framework can comprise one or more of a variety of operations, including without limitation, installing on a computer system a business application (or other application, such as an update utility) that includes a population update framework, providing a user with access to such a framework (e.g., through a business application and/or other application that implements a population update framework), executing an application that implements such a framework, and/or the like.

The method 900 further comprises providing a user interface from a computer system (block 910). As noted above, the user interface might be provided by the population update engine itself, from a business application associated with the population update engine, from a population selection engine, etc. Also as noted above, some operations might be performed on a server computer, while the user interface might be displayed on a client computer (e.g., as one or more web pages in a web browser on the client computer). The user interface can allow the user to interact with the population update engine, either to configure the population update engine, or to use the population update engine to update data for a client process, as described in further detail below.

Figure 10:
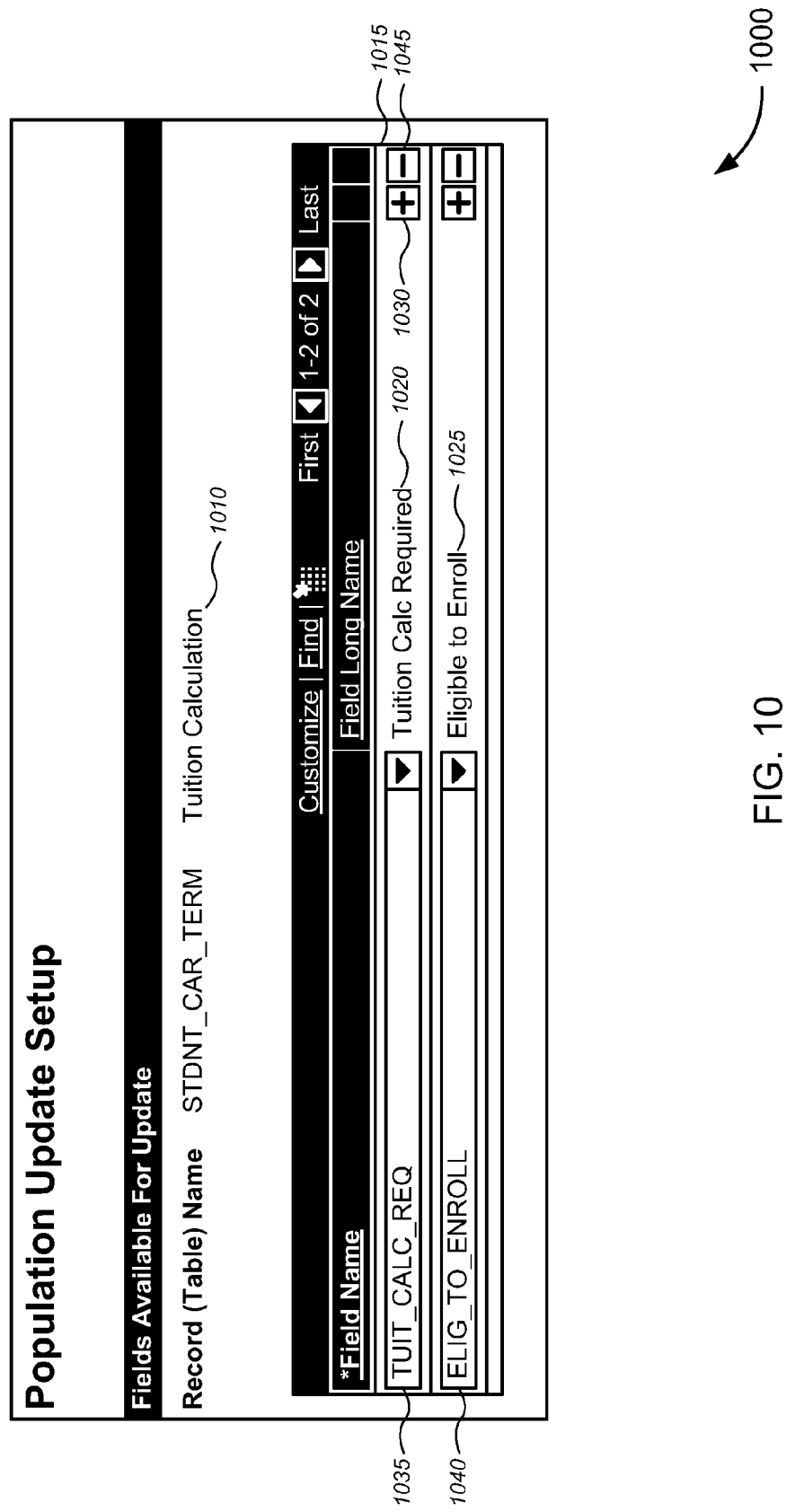
FIG. 10 is and exemplary screen display illustrating an interface for configuring a population update engine, in accordance with various embodiments of the invention.

At block 915, a set of update context metadata is received from the user, via the user interface. As noted above, in an aspect, the set of update context metadata may comprise one or more different types of information, including without limitation information about one or more business objects that are implemented (including, but not limited to business objects that are by a business application), information about available update tools, information about selection tools and/or the like. Merely by way of example, FIG. 10 is an exemplary screen display that illustrates one embodiment of a user interface 1000 for receiving a set of update context metadata about a type of business object (in this case, the business object type is a database record, although other types of business objects can be supported as well—as noted above, a business object can be, in various embodiments, a database record, a Java structure, a spreadsheet, a flat file, etc.) In an embodiment, using the interface 1000, the user can provide context metadata about the fields of a record 1010, previously selected, that should be made available for update (e.g., fields that will not adversely affect the operation of the database if they are modified by the update process). (While the illustrated example allows selection of fields in the database record, other types of data elements may be selected, depending on the type of business object about which metadata is being provided.)

FIG. 10 also illustrates that context metadata about the fields in the record may also be designated as updatable. The user interface allows for input of a record field 1015 that can be modified. An interface element, e.g., a drop-down menu 1035, allows for selection of a field within the record 1010 (in an embodiment, the menu 1035 may be populated with all of the fields in that type of record, for example, by interrogating the database containing the record to obtain the information, by hard coding the field names into the utility, etc. A label 1020 identifying a description associated with the selected field may also be displayed to facilitate selection by the user. Additional fields to be exposed to the update process can be selected by using other user interface devices, e.g., an add button 1030, to indicate that the user desires to select additional fields in the database to be designated as available to the update utility. Upon activation of the button 1030, interface elements 1025, 1040 for selecting an additional field are displayed. (Similarly, an interface element, such as a delete button 1045, can be provide to allow a user to remove a selected field from the list of fields available. The input process allows for selection of one or more portions or components in the business object that can be updated. The input process also ensures that portions of the business object that are not to be updated are also protected by not being selected.

Returning once again to FIG. 9, the method 900 further comprises configuring the population update engine based on the update context metadata (block 920). Configuring the population update engine comprises, in an aspect, storing the received metadata (e.g., in an appropriate container) and/or reading the metadata upon execution of the population update engine, so that the population update engine can properly interact with the population selection engine and/or various update tools (and/or their APIs).

Once the population update engine has been configured to define a particular business object and/or client process, the user can use the population update engine to interface with a vehicle for selecting data (e.g., a population selection engine) and/or provide data to defined update tools. Hence, the method 900 comprises, in some cases, providing (e.g., via the user interface), a display (block 925). The display can be used to allow the user to select a defined a population selection engine (for selecting a data population) and/or an update tool (for updating data in the business objects in the selected data population). Techniques for updating and/or processing data are described in further detail below.

VI. Updating Data with a Population Update Engine

Figure 11:
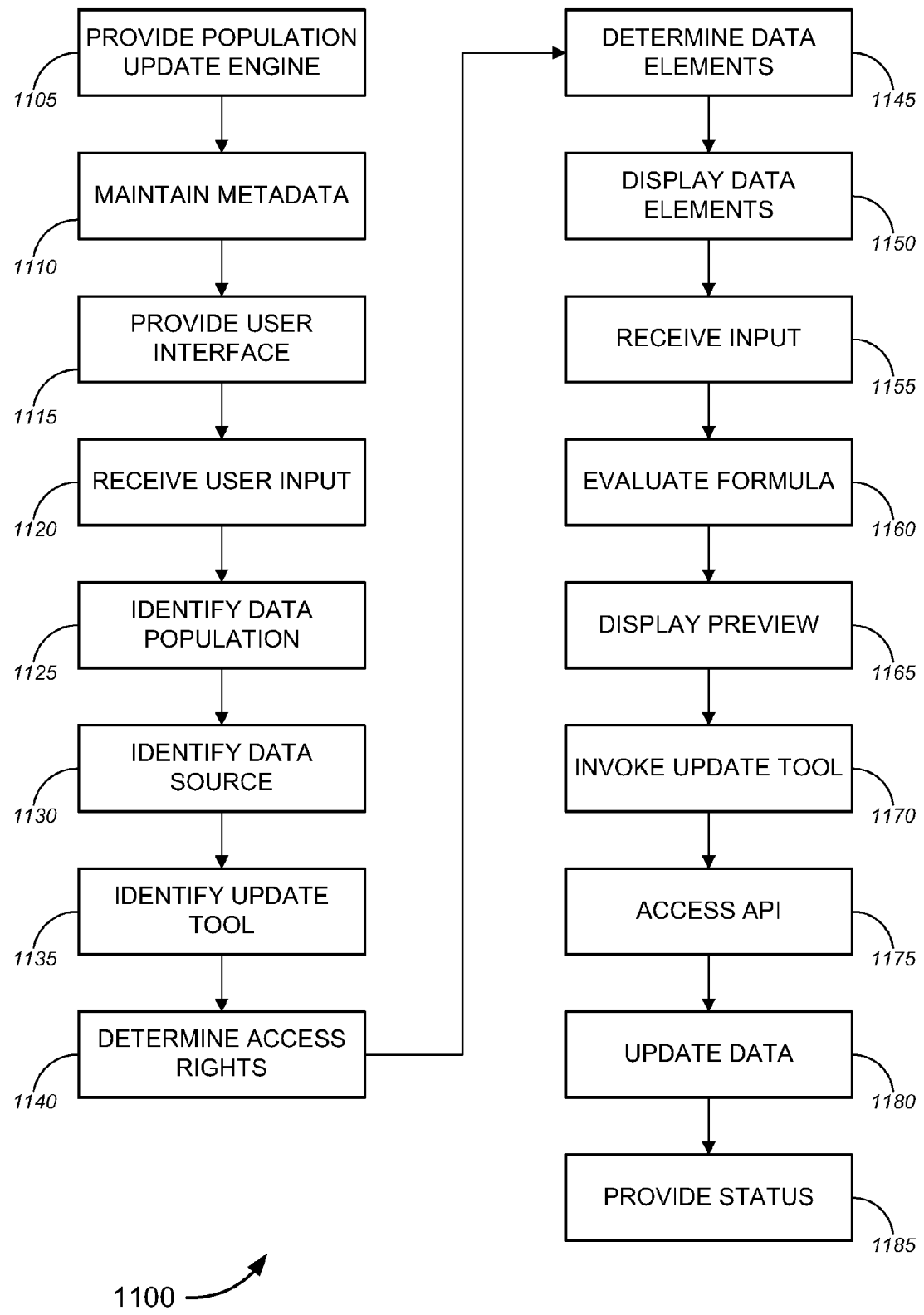
FIG. 11 is a process flow diagram illustrating a method of updating data in a business application, in accordance with various embodiments of the invention.

As noted above, some embodiments provide tools that can be used to update a business object to be processed by a business application (and, optionally, to process the data with a client process in the business application) and/or stored in a database. FIG. 11 illustrates a method 1100 of updating a business object, in accordance with one set of embodiments. (The method 1100 is described herein generally with respect to the framework of FIGS. 8A-8C; it should be appreciated, however, that the method 1100 is not limited to any particular structural implementation or software architecture; similarly, the frameworks of FIGS. 8A-8C can operate in accordance with the method 1100, as well as other modes of operation.)

The method 1100 comprises providing, at a computer system, a population update engine (block 1105). As noted above, in an aspect, a population update engine can be used to update data in one or more business objects in a data population. Providing a population update engine can comprise, inter alia, installing on a computer system a software application that comprises a population update engine, configuring a population update engine (as described above with respect to FIG. 9, for example), providing a user with access to a population update engine (including, for example, executing an application that implements a population update engine), and/or the like.

The method 1100 further comprises maintaining metadata at the computer system (block 1110). The metadata, includes, in an aspect, a set of context metadata for each type of business object that can be updated, metadata for the population selection engine itself, metadata for various selection vehicles, and/or metadata for various update tools to which the population update engine can provide data. Some examples of such metadata are described above. In a particular aspect, as noted above, a population update framework may comprise containers for storing metadata, and maintaining metadata can comprise creating the metadata, storing the metadata in the container(s), updating the metadata, accessing the metadata, and/or the like.

Figure 12:
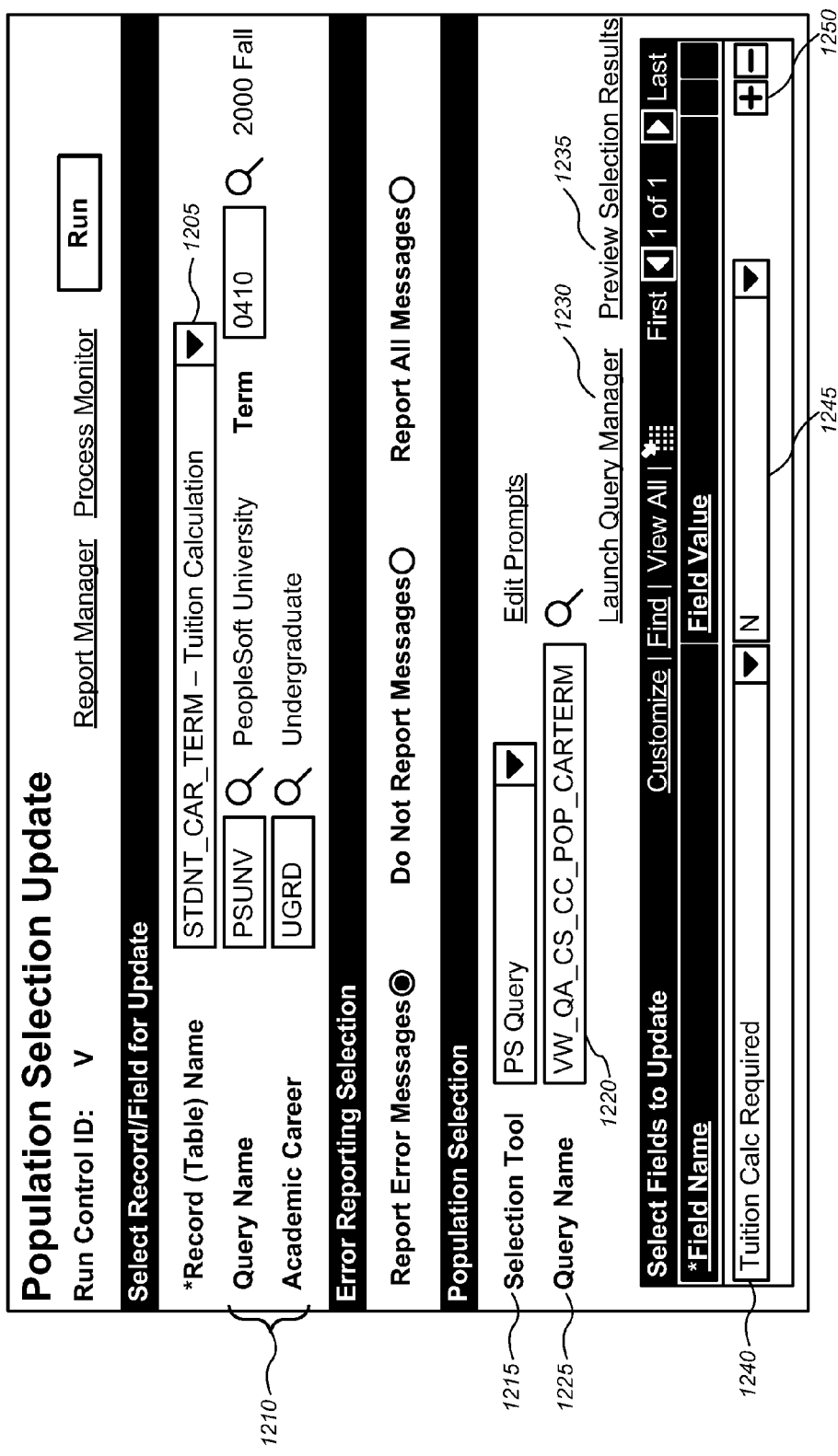
FIG. 12 is an exemplary screen display illustrating a user interface for updating a set of data to be processed by a business application, in accordance with various embodiments of the invention.

The method 1100 also comprises providing, from the computer system, a user interface (such as the user interface 830 described above with respect to FIGS. 8A and 8B) for the user to interact with the population update engine (block 1115). An example of a screen display of one such user interface 1200 is illustrated with respect to FIG. 12. The user interface 1200 can be used to allow a user to operate the population update engine to update data and provide the updated data to a client process. The exemplary interface 1200 includes an interface element (e.g., a text entry field, pulldown menu, combobox, etc.) 1205 for the user to choose a data source to be subject to the update, and one or more interface elements (collectively, 1210) to provide selection criteria to be provided to the selection tool to define a portion of the business object. The interface 1200 may also include an interface element (such as a pulldown menu 1215) for the user to identify a selection tool as to select the data population to be updated, and, optionally, one or more other interface elements for providing additional data specific to the selected selection tool (such as, in the case of a selection tool that selects from a database, a text entry field 1225 for the user to identify a name of a query to define a view in the database to be used to perform the selection and/or a link 1230 to open a query manager. (Because the interface 1200 illustrates an embodiment that implements a selection engine for selecting the data population, many of the interface elements 1205-1230 may operate in similar fashion to their counterpart elements 505-515 in the interface 500 described above with respect to FIG. 5. If other selection vehicles are used, these interface elements can vary according to the implementation of those selection vehicles).

The interface 1200 may also provide an interface element 1235 that allows the user to preview the selected data population prior to execution of the update, e.g., in the manner described above. The exemplary interface 1200 also includes a field selector interface element 1240 to select a data element be updated. In an aspect, the field selector interface element 1240 will display (and therefore allow selection of) only data elements that have been defined (e.g., by metadata) as being available for update, as described above. A value selector interface element 1245 allows the user to input an update value for the selected field (i.e., a value to be inserted into the data element during the update process). This input value can be a constant value, and/or it can be a formula, which may be evaluated at update runtime to determine a constant update value and/or which may itself be inserted as the update value. In embodiments, the value selector provides a defined set of values from which the user can select, allows for entry of one or more values. This behavior may be defined (e.g., by the metadata) according to the type of data element. Merely by way of example, if a data element is of a Boolean type, the interface element 1245 might allow selection of only Boolean values, while if the data element is of integer type, the interface element 1245 might allow input of any integer value. (Data type validation may be performed on the provided on the input, if text input is allowed.)

An interface element 1250 may be provided to allow the user to select additional data elements for updating. Upon selection of this interface element 1250, the interface 1200 provides an additional set of interface elements similar to those elements 1240, 1245 described above.

Returning to FIG. 11, at block 1120, the method 1100 comprises receiving user input (e.g., via a user interface, such as the user interface described above). Depending on the embodiment, this user input can identify the data population from which business objects are to be selected, a selection tool for selecting the business objects, an update tool to use for the update, and/or the like. Based on the user input, the method identifies a data population to be updated (block 1125). In some embodiments, identifying the data population comprises invoking a selection tool (e.g., using a population selection engine) to select the population based on selection criteria provided by the user, perhaps in the manner described above in Section III and/or via the user interface 1200 illustrated by FIG. 12. In some cases, identifying the data population comprises identifying a data source from which the data population should be drawn (block 1130), e.g., based on input from the user, based on update context metadata about the business objects in the data population, etc.

In other embodiments, the data population might be identified in other ways. Merely by way of example, in one implementation, the user might access a business object from within a business application, and the business application then might invoke the population update engine to update data for the business object, which already has been selected by default by the business application.

The method 1100 also includes identifying an update tool to update the business objects in the selected data population (block 1135). In some embodiments, the update tool may be identified implicitly, for example, based on update context metadata for the selected data population (which might specify an appropriate update tool). In other cases, only one update tool may be configured and/or there may be a default update tool. In other embodiments, the update tool may be identified explicitly (e.g., by the user providing input on which update tool should be used).

Optionally, the method 1100 might include determining whether the user has sufficient access rights to use the chosen update tool and/or to access the chosen data source (block 1140). In some cases, the API for an update tool API may include a method that allows the update engine to inquire of the update tool whether the user has sufficient access rights. In other cases, the population update engine might receive, e.g., from the user, a set of user credentials and attempt to access the update tool (and, by the extension, the update tool might attempt to access the business objects to be updated), using these credentials, such that the business objects (and/or an application that manages the business objects, such as a DBMS, a business application, etc.) provides access control for the update process itself. Hence, determining whether the user has sufficient access rights might comprise relying on an access control scheme external to the update utility itself. Merely by way of example, the population update engine might be configured to call the appropriate method in the API for the update tool, with the user's ID (or other credentials) as a parameter, and the method might return a Boolean value indicating whether the user is allowed to use the update tool and/or access the data source. In other embodiments, the population update engine might rely on its own access control scheme (e.g., the population update engine might have its own authentication and/or authorization modules). In still other embodiments, the population update engine may provide its own access control scheme (perhaps controlled by update context metadata) and/or rely on access controls provided by a population selection engine. There are a wide variety of ways in which access control can be implemented in accordance with various embodiments.

At block 1145, the population selection engine determines one or more data elements that can be modified in each of the business objects in the data population. (In one aspect, each of the business objects in a data population is of a common type, i.e., has the same data elements as the other business objects in the data population, although of course, these data elements may have different values in each respective data object.) As noted above, update context metadata can specify, for a particular type of business object, the data elements that are available to be updated (e.g., those elements whose modification will not adversely affect the operability of the business object), so this determination can be based on such metadata. Essentially, the population update engine is configured only to update data elements designated by the metadata as being updatable.

In some embodiments, the population update engine displays for the user (e.g., via the user interface) one or more data elements that can be modified (block 1150). One example of such a display is the user interface 1200 described above. The user then selects the desired data elements to be updated and/or provides input on the update values for each of the data elements, as described above with respect to FIG. 12, for example. Upon receiving this input at block 1155 (again, e.g., via the user interface), the population selection engine evaluates any formulas provided by the user as the basis for the update value to derive respective values for the data element in each of the business objects to be updated (block 1160) (or, optionally does not evaluate the formula(s) but instead passes them to the update tool, which might itself evaluate the formula(s) or might merely insert the formula(s) themselves as the updated value of the data elements in the business objects), depending on configuration options, which may be specified by update context metadata.

In some cases, the population update engine may be configured to display (e.g., via the user interface) a preview of the updated business objects (block 1165). This display can provide the user with a preview of the updated data before the user has to commit to actually updating and storing the data. In this way, the user can ensure that the correct data sets have been updated and the updates have been made correctly to the data sets. If necessary, the user can abort the update process at this point, revise the update values and/or selection of data elements, and/or the like.

At block 1170, the population update engine invokes the update tool identified as the proper update tool to use in this instance (block 1170). noted above, in some cases, invoking an update tool comprises accessing an API of the update tool (block 1175), using, for example, an adapter interface as described above. In an embodiment, invoking the update tool comprises providing the data population (again, either by actually passing the data objects in the data population or passing a reference to the business objects) to the update tool, along with information specifying the data element(s) to be updated in each business object and the value(s) with which those element(s) should be updated.

At block 1180, the update tool updates the specified data element(s) in each business object in the data population with the specified update values. Necessarily, the procedures used by the update tool will depend on the nature of the business objects being updated and/or the functionality of the update tool itself. As noted above, the update utility (and, specifically, the population update engine) can be considered, in many cases, agnostic of the techniques used by the update tool—indeed, one benefit of many embodiments is the fact that the update utility does not need to be aware of how the update tool itself operates. To list a few examples, however, the update tool might call one or more SQL procedures to update records in a database, might call a business application process to add, modify and/or delete business transactions in the business application, and/or the like.

In some embodiments, the method is configured to provide an update status that provides an indication of the result of the update process (block 1185), e.g., by displaying a status indication via the user interface. In some cases, this indication might simply be a notice that the update has successfully completed, a warning about any business objects that were not successfully updated, etc. In other cases, the indication might provide additional details (including, for example, the number of business objects updated, etc.). In some cases, providing the indication of a result of the updating might comprise writing the indication to a log file, emailing the indication to an email address of the user or another administrator, etc.

VII. Exemplary Hardware and Software Implementations

Figure 6:
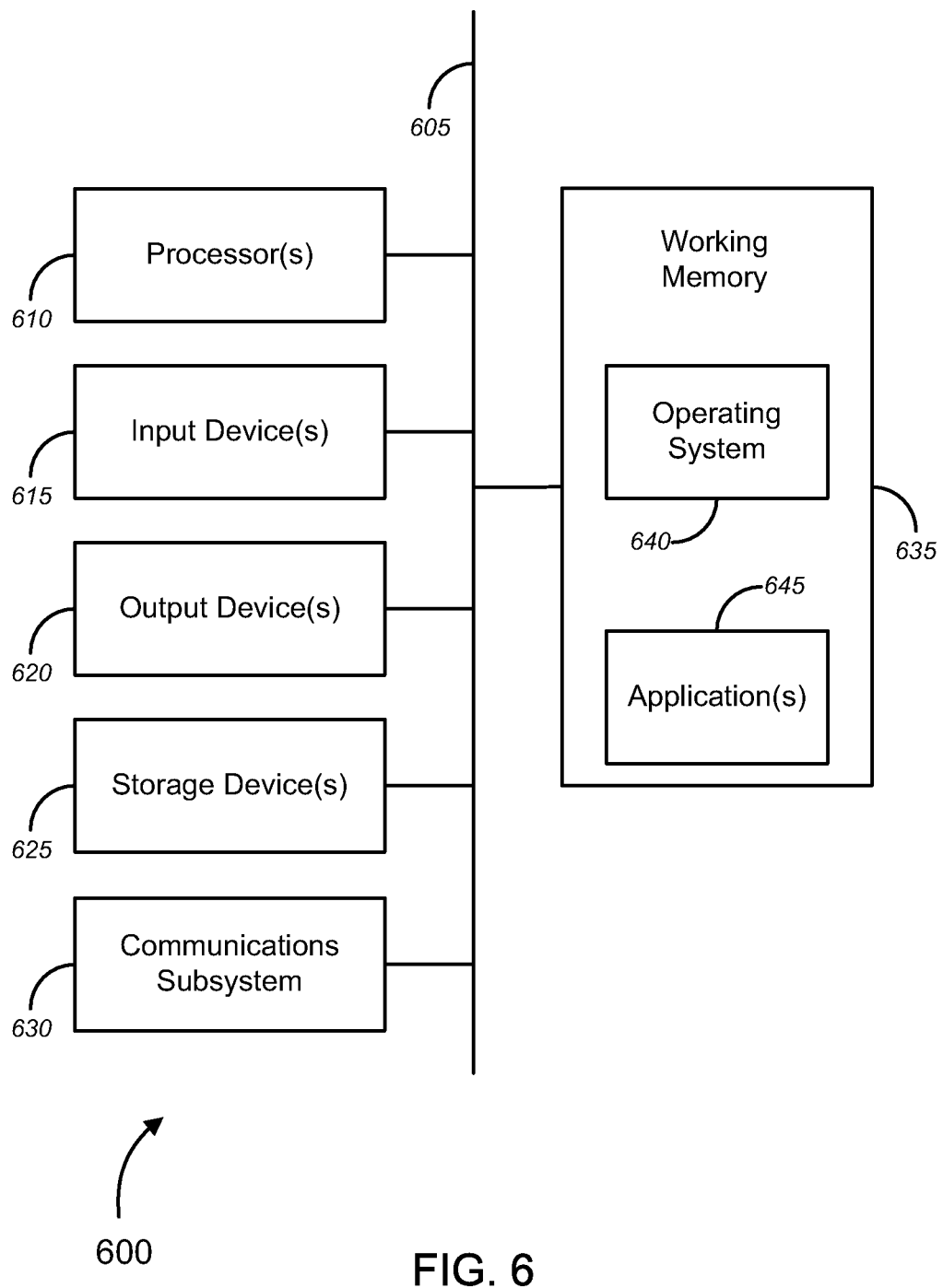
FIG. 6 is a generalized schematic diagram illustrating a computer system, in accordance with various embodiments of the invention.

FIG. 6 provides a schematic illustration of one embodiment of a computer system 600 that can perform the methods provided by various embodiments, as described herein, and/or can function as a computer system (including without limitation a server computer, a client computer, etc.). It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements can include one or more processors 610, including without limitation one or more general-purpose processors and/or one or more special-purpose processors (such as digital signal processing chips, graphics acceleration chips, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 600 might also include a communications subsystem 630, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 630 may permit data to be exchanged with a network (such as the network described below, to name one example), and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640 and/or other code, such as one or more application programs 645, which may comprise computer programs provided by various embodiments, and/or may be designed to implement methods, and/or configure systems, provided by various embodiments, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, certain embodiments employ a computer system (such as the computer system 600) to perform methods provided by other embodiments. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another machine-readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operation in a specific fashion. In an embodiment implemented using the computer system 600, various machine-readable media might be involved in providing instructions/code to processor(s) 610 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 625. Volatile media includes, without limitation dynamic memory, such as the working memory 635. Transmission media includes coaxial cables, copper wire and fiber optics, including the wires that comprise the bus 605, as well as the various components of the communication subsystem 630 (and/or the media by which the communications subsystem 630 provides communication with other devices).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read instructions and/or code.

Various forms of machine-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive the signals, and the bus 605 then might carry the signals to the working memory 635, from which the processor(s) 605 retrieves and executes the instructions. The instructions received by the working memory 635 may optionally be stored on a storage device 625 either before or after execution by the processor(s) 610.

Figure 7:
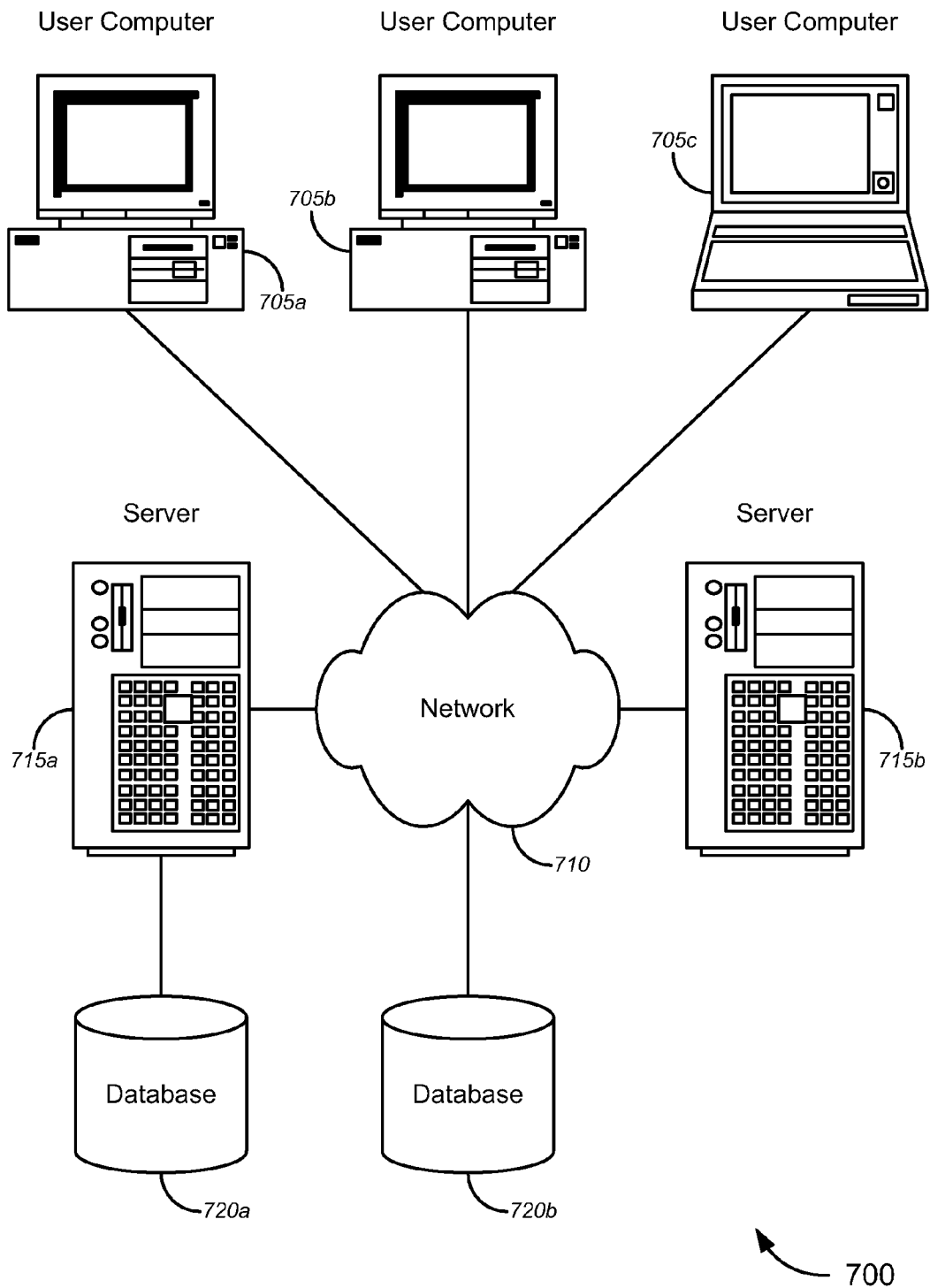
FIG. 7 is a block diagram illustrating a networked system of computers, which can be used in accordance with various embodiments of the invention.

A set of embodiments comprises systems for processing data with a business application, for selecting data to be processed, and/or for configuring a population selection engine. Merely by way of example, FIG. 7 illustrates a schematic diagram of a system 700 that can be used in accordance with one set of embodiments. The system 700 can include one or more user computers 705. The user computers 705 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 705 can also have any of a variety of applications, including one or more applications configured to perform methods of various embodiments, as well as one or more office applications, database client and/or server applications, and web browser applications. Alternatively, the user computers 705 can be any other electronic device, such as a thin-client computer, Internet-enabled mobile telephone, and/or personal digital assistant, capable of communicating via a network (e.g., the network 710 described below) and/or displaying and navigating web pages or other types of electronic documents. Although the exemplary system 700 is shown with three user computers 705, any number of user computers can be supported.

Certain embodiments may operate in a networked environment, which can include a network 710. The network 710 can be any type of network familiar to those skilled in the art that can support data communications using any of a variety of commercially-available protocols, including without limitation TCP/IP, SNA, IPX, AppleTalk, and the like. Merely by way of example, the network 710 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Some embodiments can include one or more server computers 715. Each of the server computers 715 may be configured with an operating system, including without limitation any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 may be a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments, the web server may be configured to serve web pages that can be operated within a web browser on one or more of the user computers 705 to perform methods of various embodiments.

The server computers 715, in some embodiments, might include one or application servers, which can include one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including without limitation web applications (which might, in some cases, be configured to perform methods of certain embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from clients (including, depending on the configuration, database clients, API clients, web browsers, etc.) running on a user computer 705 and/or another server 715. In some embodiments, an application server can create web pages dynamically for displaying the information in accordance with various embodiments, such as user interfaces for operating and/or configuring a population selection engine, as described above, for example. Data provided by an application server may be formatted as web pages (comprising HTML, Javascript, etc., for example) and/or may be forwarded to a user computer 705 via a web server (as described above, for example). Similarly, a web server might receive web page requests and/or input data from a user computer 705 and/or forward the web page requests and/or input data to an application server. In some cases a web server may be integrated with an application server.

In accordance with further embodiments, one or more servers 715 can function as a file server and/or can include one or more of the files (e.g., application code, data files, etc.) necessary to implement methods incorporated by an application running on a user computer 705 and/or another server 715. Alternatively, as those skilled in the art will appreciate, a file server can include all necessary files, allowing such an application to be invoked remotely by a user computer 705 and/or server 715. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720. The location of the database(s) 720 is discretionary: merely by way of example, a database 720a might reside on a storage medium local to (and/or resident in) a server 715a (and/or a user computer 705). Alternatively, a database 720b can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database(s) 720 can be a relational database, such as an Oracle database, that is adapted to store, update, and retrieve data in response to SQL-formatted commands. The database might be controlled and/or maintained by a database server, as described above, for example.

While certain features have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments.

Moreover, while the procedures comprised in the methods and processes described herein are described in a particular order for ease of description, unless the context dictates otherwise, various procedures may be reordered, added, and/or omitted in accordance with various embodiments. Further, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although certain features have been described with respect to exemplary embodiments, it will be appreciated that the invention is intended to cover all modifications and equivalents within the scope of the following claims.

What is claimed is:

1. A non-transitory computer readable medium having encoded thereon a set of instructions which, when executed by a computer, cause the computer to implement a framework for selecting a data population to be processed by a business application by:
   executing a population selection engine configured to provide one or more sets of data, selected from a data source, to the business application for processing;
   defining a plurality of sets of selection tool extensible Markup Language (XML) tags, each set of selection tool XML tags defining a different selection tool of a plurality of selection tools, each selection tool selecting data from a different type of data object as defined by the selection tool XML tags, the plurality of sets of selection tool XML tags including a first set of selection tool XML tags defining a first selection tool of the plurality of selection tools and parameters of the first selection tool;
   defining one or more sets of selection context XML tags, including a first set of selection context XML tags comprising information about a first business application process implemented by the business application to process the one or more sets of data, wherein the first set of selection context XML tags identifies by one or more Uniform Resource Locators (URLs) a set of display components used by the population selection engine to display information about the first business application process in a user interface of the business application:
   providing an application programming interface ("API") between the population selection engine and the plurality of selection tools;
   receiving identification of the first business application process to be used for processing the one or more sets of data;
   receiving identification of the first selection tool to be used to select the one or more sets of data to be processed;
   identifying the data source comprising the one or more sets of data to be processed with the business application;
   invoking the first selection tool from the population selection engine through the API using the first set of selection tool XML tags including tags defining a set of display components of the first selection tool to specify process-specific parameters and to select the one or more sets of data to be processed with the business application;
   receiving, from the first selection tool, a selection of the one or more sets of data to be processed with the business application based on execution of the first selection tool in response to said invoking and further based on the set of display components identified by the first set of selection context XML tags;
   processing each of the one or more sets of data with the first business application process in accordance with the process-specific parameters specified through the set of display components of the first selection tool; and
   displaying an indication of a result of the processing.

2. The non-transitory computer readable medium of claim 1, further comprising providing a user interface for allowing a user to select a desired selection tool having an associated set of selection tool XML tags, and the first business application process having an associated set of selection context XML tags.

3. The non-transitory computer readable medium of claim 1, wherein the first set of selection tool XML tags comprises an identification of an application class adapter for the first selection tool, wherein the application class adapter implements the API.

4. The non-transitory computer readable medium of claim 1, wherein the first set of selection tool XML tags comprises an identification of a structured query language ("SQL") view for the first selection tool to use.

5. The non-transitory computer readable medium of claim 1, wherein the first set of selection tool XML tags comprises one or more labels to be provided by a user interface to allow a user to select one or more data fields in the data source when using the first selection tool.

6. The non-transitory computer readable medium of claim 1, wherein the first set of selection tool XML tags specifies a maximum number of data sets that should be returned by the first selection tool.

7. The non-transitory computer readable medium of claim 1, wherein the first set of selection tool XML tags specifies a location of the first selection tool.

8. The non-transitory computer readable medium of claim 7, wherein the location of the first selection tool is specified as a uniform resource locator ("URL").

9. The non-transitory computer readable medium of claim 1, wherein the set of display components comprise a set of web page components.

10. The non-transitory computer readable medium of claim 1, wherein the first set of selection context XML tags specifies a set of one or more selection tools that can be used to select data for the first business application process.

11. The non-transitory computer readable medium of claim 1, wherein the first set of selection context XML tags specifies one or more data fields that are required for the first business application process and/or one or more data fields that are optional for the first business application process.

12. The non-transitory computer readable medium of claim 1, wherein the first set of selection context XML tags specifies a results record, wherein the results record is a target for output from the first business application process.

13. The non-transitory computer readable medium of claim 12, wherein the first set of selection context XML tags defines a mapping between one or more data fields in the data source and one or more fields in the results record.

14. The non-transitory computer readable medium of claim 13, wherein the first set of selection context XML tags defines a data conversion filter to apply when mapping a first data field in the data source to a first data field in the results record.

15. The non-transitory computer readable medium of claim 1, wherein the API comprises a plurality of methods that must be implemented in an application class adapter for the first selection tool.

16. The non-transitory computer readable medium of claim 15, wherein the plurality of methods comprises a method that outputs data selected by the first selection tool to a database table.

17. The non-transitory computer readable medium of claim 15, wherein the plurality of methods comprises a method that outputs data selected by the first selection tool to a set of data rows.

18. The non-transitory computer readable medium of claim 15, wherein the plurality of methods comprises a method that outputs data selected by the first selection tool to one or more hypertext markup language ("HTML") files that can be displayed for a user with a web browser.

19. The non-transitory computer readable medium of claim 15, wherein the plurality of methods comprises a method that validates a selection criteria provided to the first selection tool by the population selection engine.

20. The non-transitory computer readable medium of claim 15, wherein the plurality of methods comprises a method that launches the first selection tool.

21. The non-transitory computer readable medium of claim 15, wherein the plurality of methods comprises a method that validates an access level of a user attempting to use the first selection tool.

22. A system comprising:
a processor; and
a memory communicatively coupled with and readable by the processor and having stored therein a sequence of instructions which, when executed by the processor, causes the processor to select a data population to be processed by a business application by:
    executing a population selection engine configured to provide one or more sets of data, selected from a data source, to the business application for processing;
    defining a plurality of sets of selection tool extensible Markup Language (XML) tags, each set of selection tool XML tags defining a different selection tool of a plurality of selection tools, each selection tool selecting data from a different type of data object as defined by the selection tool XML tags, the plurality of sets of selection tool XML tags including a first set of selection tool XML tags defining a first selection tool of the plurality of selection tools and parameters of the first selection tool;
    defining one or more sets of selection context XML tags, including a first set of selection context XML tags comprising information about a first business application process implemented by the business application to process the one or more sets of data, wherein the first set of selection context XML tags identifies by one or more Uniform Resource Locators (URLs) a set of display components used by the population selection engine to display information about the first business application process in a user interface of the business application:
    providing an application programming interface ("API") between the population selection engine and the plurality of selection tools;
    receiving identification of the first business application process to be used for processing the one or more sets of data;
    receiving identification of the first selection tool to be used to select the one or more sets of data to be processed;
    identifying the data source comprising the one or more sets of data to be processed with the business application;
        invoking the first selection tool from the population selection engine through the API using the first set of selection tool XML tags including tags defining a set of display components of the first selection tool to specify process-specific parameters and to select the one or more sets of data to be processed with the business application;
        receiving, from the first selection tool, a selection of the one or more sets of data to be processed with the business application based on execution of the first selection tool in response to said invoking and further based on the set of display components identified by the first set of selection context XML tags; and
        processing each of the one or more sets of data with the first business application process in accordance with the process-specific parameters specified through the set of display components of the first selection tool.

23. A method for select a data population to be processed by a business application, the method comprising:
    executing, by a computer system, a population selection engine configured to provide one or more sets of data, selected from a data source, to the business application for processing;
    defining, by the computer system, a plurality of sets of selection tool extensible Markup Language (XML) tags, each set of selection tool XML tags defining a different selection tool of a plurality of selection tools, each selection tool selecting data from a different type of data object as defined by the selection tool XML tags, the plurality of sets of selection tool XML tags including a first set of selection tool XML tags defining a first selection tool of the plurality of selection tools and parameters of the first selection tool;
    defining, by the computer system, one or more sets of selection context XML tags, including a first set of selection context XML tags comprising information about a first business application process implemented by the business application to process the one or more sets of data, wherein the first set of selection context XML tags identifies by one or more Uniform Resource Locators (URLs) a set of display components used by the population selection engine to display information about the first business application process in a user interface of the business application;

providing, by the computer system, an application programming interface ("API") between the population selection engine and the plurality of selection tools;

receiving, by the computer system, identification of the first business application process to be used for processing the one or more sets of data;

receiving, by the computer system, identification of the first selection tool to be used to select the one or more sets of data to be processed;

identifying, by the computer system, the data source comprising the one or more sets of data to be processed with the business application;

invoking the first selection tool from the population selection engine through the API using the first set of selection tool XML tags including tags defining a set of display components of the first selection tool to specify process-specific parameters and to select the one or more sets of data to be processed with the business application;

receiving, from the first selection tool, a selection of the one or more sets of data to be processed with the business application based on execution of the first selection tool in response to said invoking and further based on the set of display components identified by the first set of selection context XML tags; and processing each of the one or more sets of data with the first business application process in accordance with the process-specific parameters specified through the set of display components of the first selection tool.

* * * * *